US009223839B2

(12) United States Patent
Marti et al.

(10) Patent No.: US 9,223,839 B2
(45) Date of Patent: Dec. 29, 2015

(54) SUPERVISOR HISTORY VIEW WIZARD

(75) Inventors: Jerry Marti, West Salem, OH (US); Anthony Pishnery, North Royalton, OH (US); Joe Stough, Cleveland, OH (US); Ajo Paul, Balgalore (IN); Sundaramoorthi Thangavel, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 824 days.

(21) Appl. No.: 13/402,780

(22) Filed: Feb. 22, 2012

(65) Prior Publication Data
US 2013/0218889 A1    Aug. 22, 2013

(51) Int. Cl.
G06F 17/30   (2006.01)
G06F 3/0481  (2013.01)
G06F 3/0482  (2013.01)

(52) U.S. Cl.
CPC ........ G06F 17/30557 (2013.01); *G06F 3/0481* (2013.01); *G06F 3/0482* (2013.01)

(58) Field of Classification Search
CPC ............... G06F 3/0481; G06F 3/0482; G06F 17/30557; G09G 5/14
USPC ........................ 715/764, 781; 700/9; 707/736
See application file for complete search history.

(56) References Cited

U.S. PATENT DOCUMENTS

| 4,375,637 A | 3/1983 | Desjardins |
| 4,816,208 A | 3/1989 | Woods et al. |
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,946,303 A | 8/1999 | Watson et al. |

(Continued)

FOREIGN PATENT DOCUMENTS

| WO | WO 01/97146 | 12/2001 |
| WO | WO 02/052432 | 7/2002 |

(Continued)

OTHER PUBLICATIONS

Adobe Acrobat 6.0 Standard, Version 6.0.2, Screenshots, 2 pages, May 18, 2004.

(Continued)

*Primary Examiner* — Kieu Vu
*Assistant Examiner* — Asteway T Gattew
(74) *Attorney, Agent, or Firm* — Seager, Tufte & Wickhem, LLP

(57) ABSTRACT

An approach for selecting points of archived history data for viewing. The approach may relate to a user interface workflow of selecting points. Site controllers may be configured using control entity definitions, history extensions, point group naming and template features of a supervisor. The supervisor may provide for selection of groups or categories of sites and controllers within selected sites using selection boxes. This may permit a user to quickly refine site selection by, for example, filtering by group, site category, and a refined site list box. Once a site, the controllers and desired point groups and other appropriate items have been selected, the user may proceed to view historical data for the selected sites and controller points.

20 Claims, 20 Drawing Sheets

(56) References Cited

U.S. PATENT DOCUMENTS

| | | |
|---|---|---|
| 5,955,946 A | 9/1999 | Beheshti et al. |
| 6,031,343 A | 2/2000 | Recknagel et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |
| 6,295,526 B1 | 9/2001 | Kreiner et al. |
| 6,295,527 B1 | 9/2001 | McCormack et al. |
| 6,301,624 B1 | 10/2001 | Lee et al. |
| 6,314,328 B1 | 11/2001 | Powell |
| 6,351,213 B1 | 2/2002 | Hirsch |
| 6,356,282 B2 | 3/2002 | Roytman et al. |
| 6,389,464 B1 | 5/2002 | Krishnamurthy et al. |
| 6,420,968 B1 | 7/2002 | Hirsch |
| 6,430,712 B2 | 8/2002 | Lewis |
| 6,466,654 B1 | 10/2002 | Cooper et al. |
| 6,473,407 B1 | 10/2002 | Ditmer et al. |
| 6,492,901 B1 | 12/2002 | Ridolfo |
| 6,535,122 B1 | 3/2003 | Bristol |
| 6,549,135 B2 | 4/2003 | Singh et al. |
| 6,643,355 B1 | 11/2003 | Tsumpes |
| 6,643,516 B1 | 11/2003 | Stewart |
| 6,675,591 B2 | 1/2004 | Singh et al. |
| 6,681,156 B1 | 1/2004 | Weiss |
| 6,690,980 B2 | 2/2004 | Powell |
| 6,761,470 B2 | 7/2004 | Sid |
| 6,813,587 B2 | 11/2004 | McIntyre et al. |
| 6,816,811 B2 | 11/2004 | Seem |
| 6,832,120 B1 | 12/2004 | Frank et al. |
| 6,870,141 B2 | 3/2005 | Damrath et al. |
| 6,879,253 B1 | 4/2005 | Thuillard |
| 6,892,546 B2 | 5/2005 | Singh et al. |
| 6,919,809 B2 | 7/2005 | Blunn et al. |
| 6,947,972 B2 | 9/2005 | Chun |
| 6,955,302 B2 | 10/2005 | Erdman, Jr. |
| 6,966,060 B1 | 11/2005 | Young et al. |
| 6,973,627 B1 | 12/2005 | Appling |
| 6,990,821 B2 | 1/2006 | Singh et al. |
| 7,009,510 B1 | 3/2006 | Douglass et al. |
| 7,024,283 B2 | 4/2006 | Bicknell |
| 7,026,925 B2 | 4/2006 | Roche et al. |
| 7,031,880 B1 | 4/2006 | Seem et al. |
| 7,062,389 B2 | 6/2006 | Johnson et al. |
| 7,068,931 B2 | 6/2006 | Tokunaga |
| 7,069,181 B2 | 6/2006 | Jerg et al. |
| 7,085,674 B2 | 8/2006 | Iwasawa |
| 7,107,268 B1 | 9/2006 | Zawadzki et al. |
| 7,113,085 B2 | 9/2006 | Havekost |
| 7,133,141 B1 | 11/2006 | Abi-Salch |
| 7,171,287 B2 | 1/2007 | Weiss |
| 7,183,907 B2 | 2/2007 | Simon et al. |
| 7,206,646 B2 | 4/2007 | Nilson et al. |
| 7,243,044 B2 | 7/2007 | McCalla |
| 7,250,856 B2 | 7/2007 | Havekost et al. |
| 7,272,452 B2 | 9/2007 | Coogan et al. |
| 7,277,018 B2 | 10/2007 | Reyes et al. |
| 7,320,023 B2 | 1/2008 | Chintalapati et al. |
| 7,345,580 B2 | 3/2008 | Akamatsu et al. |
| 7,379,997 B2 | 5/2008 | Ehlers et al. |
| 7,386,586 B1 | 6/2008 | Headley et al. |
| 7,428,726 B1 | 9/2008 | Cowan et al. |
| 7,457,869 B2 | 11/2008 | Kernan |
| 7,460,020 B2 | 12/2008 | Reyes et al. |
| 7,490,319 B2 | 2/2009 | Blackwell et al. |
| 7,496,911 B2 | 2/2009 | Rowley et al. |
| 7,565,225 B2 | 7/2009 | Dushane et al. |
| 7,596,613 B2 | 9/2009 | Silverthorne et al. |
| 7,644,371 B2 | 1/2010 | Robertson et al. |
| 7,653,459 B2 | 1/2010 | Pouchak et al. |
| 7,703,073 B2 | 4/2010 | Illowsky et al. |
| 7,734,572 B2 | 6/2010 | Wiemeyer et al. |
| 7,774,457 B1 | 8/2010 | Talwar et al. |
| 7,782,302 B2 | 8/2010 | Lee et al. |
| 7,819,334 B2 | 10/2010 | Pouchak et al. |
| 7,826,929 B2 | 11/2010 | Wacker |
| 7,870,090 B2 | 1/2011 | McCoy et al. |
| 7,873,719 B2 | 1/2011 | Bishop et al. |
| 7,886,031 B1 | 2/2011 | Taylor et al. |
| 7,890,927 B2 | 2/2011 | Eldridge et al. |
| 7,900,228 B2 | 3/2011 | Stark et al. |
| 7,904,186 B2 | 3/2011 | Mairs et al. |
| 7,941,786 B2 | 5/2011 | Scott et al. |
| 8,078,481 B2 | 12/2011 | Steinbarth et al. |
| 8,090,477 B1 | 1/2012 | Steinberg |
| 8,112,162 B2 | 2/2012 | Pouchak et al. |
| 8,146,060 B2 | 3/2012 | Lekel |
| 8,190,273 B1 | 5/2012 | Federspiel et al. |
| 8,218,570 B2 | 7/2012 | Moran et al. |
| 8,224,466 B2 | 7/2012 | Wacker |
| 8,224,763 B2 | 7/2012 | Guralnik et al. |
| 8,224,888 B2 | 7/2012 | Brindle |
| 8,225,292 B2 | 7/2012 | Naslavsky et al. |
| 8,239,500 B2 | 8/2012 | Pouchak |
| 8,335,593 B2 | 12/2012 | Johnson et al. |
| 8,341,599 B1 | 12/2012 | Angalet et al. |
| 8,347,291 B2 | 1/2013 | Marwinski |
| 8,352,047 B2 | 1/2013 | Walter |
| 8,527,947 B2 | 9/2013 | Clemm |
| 8,572,616 B2 | 10/2013 | Cai et al. |
| 8,819,562 B2 | 8/2014 | Nair et al. |
| 2002/0002425 A1 | 1/2002 | Dossey et al. |
| 2002/0073076 A1 | 6/2002 | Xu et al. |
| 2002/0122073 A1* | 9/2002 | Abrams et al. ............... 345/838 |
| 2002/0152298 A1 | 10/2002 | Kikta et al. |
| 2003/0078677 A1 | 4/2003 | Hull et al. |
| 2003/0101009 A1 | 5/2003 | Seem |
| 2003/0171851 A1 | 9/2003 | Brickfield et al. |
| 2004/0027004 A1 | 2/2004 | Bayoumi et al. |
| 2004/0138981 A1* | 7/2004 | Ehlers et al. ................. 705/36 |
| 2004/0143510 A1 | 7/2004 | Haeberle et al. |
| 2004/0230328 A1 | 11/2004 | Armstrong et al. |
| 2005/0038571 A1 | 2/2005 | Brickfield et al. |
| 2005/0043862 A1 | 2/2005 | Brickfield et al. |
| 2005/0143863 A1 | 6/2005 | Ruane et al. |
| 2005/0193285 A1 | 9/2005 | Jeon |
| 2005/0203490 A1 | 9/2005 | Simonson |
| 2005/0222889 A1 | 10/2005 | Lai et al. |
| 2006/0020962 A1 | 1/2006 | Stark et al. |
| 2006/0038672 A1 | 2/2006 | Schoettle |
| 2006/0058923 A1 | 3/2006 | Kruk et al. |
| 2006/0064305 A1 | 3/2006 | Alonso |
| 2006/0069886 A1 | 3/2006 | Tulyani |
| 2006/0077726 A1 | 4/2006 | Shimmitsu |
| 2006/0095835 A1 | 5/2006 | Kennedy et al. |
| 2006/0136558 A1 | 6/2006 | Sheehan et al. |
| 2006/0168013 A1 | 7/2006 | Wilson et al. |
| 2006/0253205 A1 | 11/2006 | Gardiner |
| 2007/0198674 A1 | 8/2007 | Li et al. |
| 2008/0010049 A1 | 1/2008 | Pouchak et al. |
| 2008/0189162 A1 | 8/2008 | Ganong et al. |
| 2009/0055914 A1 | 2/2009 | Azami |
| 2009/0083303 A1* | 3/2009 | Singh et al. ................... 707/102 |
| 2009/0106684 A1 | 4/2009 | Chakra et al. |
| 2009/0113037 A1 | 4/2009 | Pouchak |
| 2009/0287526 A1 | 11/2009 | Ramkumar et al. |
| 2010/0106543 A1* | 4/2010 | Marti ............................. 705/7 |
| 2010/0131653 A1 | 5/2010 | Dharwada et al. |
| 2010/0131877 A1 | 5/2010 | Dharwada et al. |
| 2010/0198651 A1 | 8/2010 | Johnson et al. |
| 2010/0251184 A1* | 9/2010 | Majewski et al. ............. 715/841 |
| 2010/0286937 A1 | 11/2010 | Hedley et al. |
| 2010/0324962 A1* | 12/2010 | Nesler et al. .................. 705/8 |
| 2011/0010654 A1 | 1/2011 | Raymond et al. |
| 2011/0083077 A1 | 4/2011 | Nair et al. |
| 2011/0087731 A1 | 4/2011 | Wong et al. |
| 2011/0093493 A1 | 4/2011 | Nair et al. |
| 2011/0098863 A1 | 4/2011 | Miki |
| 2011/0113360 A1 | 5/2011 | Johnson et al. |
| 2011/0196539 A1 | 8/2011 | Nair et al. |
| 2011/0225580 A1 | 9/2011 | Nair et al. |
| 2011/0298608 A1 | 12/2011 | Ranjan et al. |
| 2011/0316688 A1 | 12/2011 | Ranjan et al. |

(56) References Cited

U.S. PATENT DOCUMENTS

| | | |
|---|---|---|
| 2012/0005731 A1 | 1/2012 | Lei et al. |
| 2012/0084660 A1 | 4/2012 | Nair et al. |
| 2012/0084696 A1 | 4/2012 | Marti |
| 2012/0166992 A1 | 6/2012 | Huynh et al. |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Copy of U.S. Appl. No. 13/657,620, filed Oct. 22, 2012.
Honeywell Spyder Bacnet User's Guide, 242 pages, Revised Jul. 2009.
Honeywell Spyder User's Guide 202 pages, Released Jul. 2007.
Honeywell, "Excel Building Supervisor-Integrated R7044 and FS90 Ver. 2.0," Operator Manual, 70 pages, Apr. 1995.
Honeywell, "Excel 15B W7760B Building Manager," User's Guide, 84 pages, Revised Jan. 2005.
http://blogs.msdn.com/b/khen1234/archive/2005/05/11/416392. aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.google.com/maps, "Google Maps, Pin Location," 1 page, prior to Nov. 21, 2008.
Johnson Controls, "Fx Workbench, User's Guide," 818 pages, issued May 19, 2008, (this article will be uploaded to USPTO website in 5 parts).
Microsoft Word Screen Shots, 2 pages, prior to Nov. 21, 2008.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Siemens, BACnet for DESIGO 27 Pages, prior to Dec. 30, 2009.
Trane, "System Programming, Tracer Summit Version 14, BMTW-SVP01D-EN," 623 pages, 2002, (this article will be uploaded to USPTO website in 3 parts).
Tridium, "NiagaraAX Product Model Overview," 7 pages, 2005.
Tridium, "Tridium & Niagara Framework Overview," 9 pages, prior to Oct. 28, 2008.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Acess, Format, and Integrate Data, 4 pages, Dec. 2003.
Honeywell, "ComfortPoint Open BMS Release 100," Specification and Technical Data, 13 pages, Jun. 2012.
http://www.de2m.com/DE2R_Technical.html, "Data Enabled Enterprise Repository (DE2R) Technical Overview," 4 pages, printed Mar. 8, 2013.
Bersoff et al., "Impacts of Life Cycle Models on Software," Communications of the ACM, vol. 34, No. 8, pp. 104-118, Aug. 1991.
U.S. Appl. No. 14/059,286, filed Oct. 21, 2013.
U.S. Appl. No. 14/327,451, filed Jul. 9, 2014.
http://domin.dom.edu/documents/emaildocs/outlook/, "Outlook Web Access 2003," 19 pages, printed Nov. 7, 2013.
Kalavade et al., "A Hardware-Software Codesign Methodology for DSP Applications," IEEE Design and Test of Computers, pp. 16-28, 1993.
Magnusson et al., "Simics: A Full Simulation Platform," IEEE, pp. 50-58, 2002.
McCown et al., "APSIM: A Novel Software System for Model Development, Model Testing and Simulation in Agricultural Systems Research," Agricultural Systems, vol. 50, pp. 255-271, 1996.
Niagara, "Niagara AX-3.x User Guide," Tridium Inc., 436 pages, 2007.
Pressman, "Software Engineering Notes—Compiled from Software Engineering A Practitioner's Approach," Fifth Edition, 67 pages, 2009.
Simunic et al, "Cycle-Accurate Simulation of Energy Consumption in Embedded Systems," ACM, pp. 867-872, 1999.
Trane, "Tracer MP580/581 Programmable Controllers," CNT-PRC002-EN, Mar. 2003.
Vykon by Tridium, "Niagara Browser Access Guide," 125 pages, revised Aug. 15, 2002.
Vykon by Tridium, "Niagara Networking & Connectivity Guide," Niagara Release 2.3, 245 pages, 2002.

\* cited by examiner history:Circuit01 CutInStpt
31-Dec-69 12:00 AM EST to ?

| Timestamp | Trend Flags | Status | Value |
|---|---|---|---|
| 29-Sep-10 12:00:00 PM CDT | { } | {ok} | -8.00 |
| 29-Sep-10 1:00:00 PM CDT | { } | {ok} | -8.00 |
| 29-Sep-10 2:00:00 PM CDT | { } | {ok} | -8.00 |
| 29-Sep-10 3:00:00 PM CDT | { } | {ok} | -8.00 |
| 29-Sep-10 4:00:00 PM CDT | { } | {ok} | -8.00 |
| 29-Sep-10 5:00:00 PM CDT | { } | {ok} | -8.00 |
| 29-Sep-10 6:00:00 PM CDT | { } | {ok} | -8.00 |
| 29-Sep-10 7:00:00 PM CDT | { } | {ok} | -8.00 |
| 29-Sep-10 8:00:00 PM CDT | { } | {ok} | -8.00 |
| 29-Sep-10 9:00:00 PM CDT | { } | {ok} | -8.00 |
| 29-Sep-10 10:00:00 PM CDT | { } | {ok} | -8.00 |
| 29-Sep-10 11:00:00 PM CDT | { } | {ok} | -8.00 |
| 30-Sep-10 12:00:00 AM CDT | { } | {ok} | -8.00 |
| 30-Sep-10 1:00:00 AM CDT | { } | {ok} | -8.00 |
| 30-Sep-10 2:00:00 AM CDT | { } | {ok} | -8.00 |
| 30-Sep-10 3:00:00 AM CDT | { } | {ok} | -8.00 |
| 30-Sep-10 4:00:00 AM CDT | { } | {ok} | -8.00 |

| | A | B | C | D | E | F | G | H | I | J | K |
|---|---|---|---|---|---|---|---|---|---|---|---|
| 1 | Group | Category | SiteName | SiteCity | SiteState | Nzm | Controller | Date | Time | ControlSetpoint | OutdoorTemp SetpointOffset Sq |
| 2 | WMT | | 1151 | KansasCity | KS | HML | RTU 3RD CTR-IAQ | 16-Mar-11 | 08:15 CDT | 67 | 48.42 0 |
| 3 | WMT | | 1151 | KansasCity | KS | HML | RTU 3RD CTR-IAQ | 16-Mar-11 | 08:00 CDT | 67 | 49.05 0 |
| 4 | WMT | | 1151 | KansasCity | KS | HML | RTU 3RD LFT-IAQ | 16-Mar-11 | 08:15 CDT | 66 | 45.81 0 |
| 5 | WMT | | 1151 | KansasCity | KS | HML | RTU 3RD LFT-IAQ | 16-Mar-11 | 08:00 CDT | 66 | 46.44 0 |
| 6 | WMT | | 1151 | KansasCity | KS | HML | RTU 3RD RGT-IAQ | 16-Mar-11 | 08:15 CDT | 67 | 45.81 0 |
| 7 | WMT | | 1151 | KansasCity | KS | HML | RTU 3RD RGT-IAQ | 16-Mar-11 | 08:00 CDT | 67 | 45.81 0 |
| 8 | WMT | | 5261 | Pineville | MO | HML | RTU 1ST RIGHT | 16-Mar-11 | 08:15 CDT | 75 | 0 |
| 9 | WMT | | 5261 | Pineville | MO | HML | RTU 1ST RIGHT | 16-Mar-11 | 08:00 CDT | 75 | 0 |
| 10 | WMT | | 5261 | Pineville | MO | HML | RTU 2ND LEFT | 16-Mar-11 | 08:15 CDT | 67 | 0 |
| 11 | WMT | | 5261 | Pineville | MO | HML | RTU 2ND LEFT | 16-Mar-11 | 08:00 CDT | 67 | 0 |
| 12 | WMT | | 5261 | Pineville | MO | HML | RTU 2ND RIGHT | 16-Mar-11 | 08:15 CDT | 75 | 0 |
| 13 | WMT | | 5261 | Pineville | MO | HML | RTU 2ND RIGHT | 16-Mar-11 | 08:00 CDT | 75 | 0 |
| 14 | WMT | | 5261 | Pineville | MO | HML | RTU 3RD CENTER | 16-Mar-11 | 08:15 CDT | 75 | 0 |
| 15 | WMT | | 5261 | Pineville | MO | HML | RTU 3RD CENTER | 16-Mar-11 | 08:00 CDT | 75 | 0 |
| 16 | WMT | | 5261 | Pineville | MO | HML | RTU 3RD LEFT | 16-Mar-11 | 08:15 CDT | 67 | 0 |
| 17 | WMT | | 5261 | Pineville | MO | HML | RTU 3RD LEFT | 16-Mar-11 | 08:00 CDT | 67 | 0 |
| 18 | WMT | | 5261 | Pineville | MO | HML | RTU 3RD RGT-IAQ | 16-Mar-11 | 08:15 CDT | 75 | 0 |
| 19 | WMT | | 5261 | Pineville | MO | HML | RTU 3RD RGT-IAQ | 16-Mar-11 | 08:00 CDT | 75 | 0 |
| 20 | WMT | | 914 | Cassville | MO | HML | RTU 1ST LEFT | 16-Mar-11 | 08:15 CDT | 75 | 0 |
| 21 | WMT | | 914 | Cassville | MO | HML | RTU 1ST LEFT | 16-Mar-11 | 08:00 CDT | 75 | 0 |
| 22 | WMT | | 914 | Cassville | MO | HML | RTU 3RD CENTER | 16-Mar-11 | 08:15 CDT | 67 | 0 |
| 23 | WMT | | 914 | Cassville | MO | HML | RTU 3RD CENTER | 16-Mar-11 | 08:00 CDT | 67 | 0 |
| 24 | WMT | | 914 | Cassville | MO | HML | RTU 3RD LFT-IAQ | 16-Mar-11 | 08:15 CDT | 67 | 0 |
| 25 | WMT | | 914 | Cassville | MO | HML | RTU 3RD LFT-IAQ | 16-Mar-11 | 08:00 CDT | 67 | 0 |

FIGURE 14

CONTROL ENTITY STACKING

| Group | Site | City | State | XCM | Controller | Date | Time | ZoneTemp | SupplyTemp |
|---|---|---|---|---|---|---|---|---|---|
| WMT | 7545 | Cleveland | OH | xcm1 | GardenCtr | 9-22-2010 | 11:00 am | 75 | 72 |
| WMT | 7545 | Cleveland | OH | xcm1 | GardenCtr | 9-22-2010 | 11:10 am | 75 | 72 |
| WMT | 7545 | Cleveland | OH | xcm1 | GardenCtr | 9-22-2010 | 11:20 am | 75 | 72 |
| WMT | 7545 | Cleveland | OH | xcm1 | AutoCtr | 9-22-2010 | 11:00 am | 75 | 72 |
| WMT | 7545 | Cleveland | OH | xcm1 | AutoCtr | 9-22-2010 | 11:10 am | 75 | 72 |
| WMT | 7545 | Cleveland | OH | xcm1 | AutoCtr | 9-22-2010 | 11:20 am | 75 | 72 |
| WMT | 4321 | Akron | OH | xcm2 | GardenCtr | 9-22-2010 | 11:00 am | 75 | 72 |
| WMT | 4321 | Akron | OH | xcm2 | GardenCtr | 9-22-2010 | 11:10 am | 75 | 72 |
| WMT | 4321 | Akron | OH | xcm2 | GardenCtr | 9-22-2010 | 11:20 am | 75 | 72 |
| WMT | 4321 | Akron | OH | xcm2 | AutoCtr | 9-22-2010 | 11:00 am | 75 | 72 |
| WMT | 4321 | Akron | OH | xcm2 | AutoCtr | 9-22-2010 | 11:10 am | 75 | 72 |
| WMT | 4321 | Akron | OH | xcm2 | AutoCtr | 9-22-2010 | 11:20 am | 75 | 72 |

FIGURE 15

XCM STACKING

| Group | Site | City | State | XCM | Date | Time | GardenCtr ZoneTemp | GardenCtr SupplyTemp | AutoCtr ZoneTemp | AutoCtr SupplyTemp |
|---|---|---|---|---|---|---|---|---|---|---|
| WMT | 7545 | Cleveland | OH | xcm1 | 9-22-2010 | 11:00 am | 75 | 72 | 75 | 72 |
| WMT | 7545 | Cleveland | OH | xcm1 | 9-22-2010 | 11:10 am | 75 | 72 | 75 | 72 |
| WMT | 7545 | Cleveland | OH | xcm1 | 9-22-2010 | 11:20 am | 75 | 72 | 75 | 72 |
| WMT | 4321 | Akron | OH | xcm2 | 9-22-2010 | 11:00 am | 75 | 72 | 75 | 72 |
| WMT | 4321 | Akron | OH | xcm2 | 9-22-2010 | 11:10 am | 75 | 72 | 75 | 72 |
| WMT | 4321 | Akron | OH | xcm2 | 9-22-2010 | 11:20 am | 75 | 72 | 75 | 72 |

FIGURE 16

SITE STACKING

| Group | Site | City | State | Date | Time | xcu1 GardenCtr ZoneTemp | xcu1 GardenCtr SupplyTemp | xcu1 AutoCtr ZoneTemp | xcu1 AutoCtr SupplyTemp | xcu2 GardenCtr ZoneTemp | xcu2 GardenCtr SupplyTemp | xcu2 AutoCtr ZoneTemp | xcu2 AutoCtr SupplyTemp |
|---|---|---|---|---|---|---|---|---|---|---|---|---|---|
| WMT | 7545 | Cleveland | OH | 9-22-2010 | 11:00 am | 75 | 72 | 75 | 72 | 75 | 72 | 75 | 72 |
| WMT | 7545 | Cleveland | OH | 9-22-2010 | 11:10 am | 75 | 72 | 75 | 72 | 75 | 72 | 75 | 72 |
| WMT | 7545 | Cleveland | OH | 9-22-2010 | 11:20 am | 75 | 72 | 75 | 72 | 75 | 72 | 75 | 72 |
| WMT | 4321 | Akron | OH | 9-22-2010 | 11:00 am | 75 | 72 | 75 | 72 | 75 | 72 | 75 | 72 |
| WMT | 4321 | Akron | OH | 9-22-2010 | 11:10 am | 75 | 72 | 75 | 72 | 75 | 72 | 75 | 72 |
| WMT | 4321 | Akron | OH | 9-22-2010 | 11:20 am | 75 | 72 | 75 | 72 | 75 | 72 | 75 | 72 |

FIGURE 17

SUPERVISOR HISTORY VIEW WIZARD

BACKGROUND

The present disclosure pertains to viewing information and particularly to selective viewing of certain portions of large amounts of information.

SUMMARY

The disclosure reveals an approach for selecting points of archived history data for viewing. The approach may relate to a user interface workflow of selecting points. Site controllers may be configured using control entity definitions, history extensions and template features of a supervisor. The supervisor may provide for selection of groups or categories of sites and controllers within selected sites using selection boxes. This may permit a user to quickly refine site selection by, for example, filtering by group, site category, and a refined site list box. Once a site, the controllers and desired point groups and other appropriate items have been selected, the user may proceed to view historical data for the selected sites and controller points.

BRIEF DESCRIPTION OF THE DRAWING

FIGS. 8 and 9 are diagrams of screen prints of an existing history export in a portable document format;

FIG. 11 is a diagram of a screen print revealing a history view with XCM stacking;

FIG. 13 is a diagram of a screen print revealing a history export in a portable document format;

FIG. 14 is a diagram of a screen print revealing a history export comma-separated values file format;

FIG. 15 is a diagram of a screen print revealing control entity stacking detail clarifications;

FIG. 16 is a diagram of a screen print revealing XCM stacking detail clarifications;

FIG. 17 is a diagram of a screen print revealing site stacking detail clarifications;

DESCRIPTION

Figure 1:
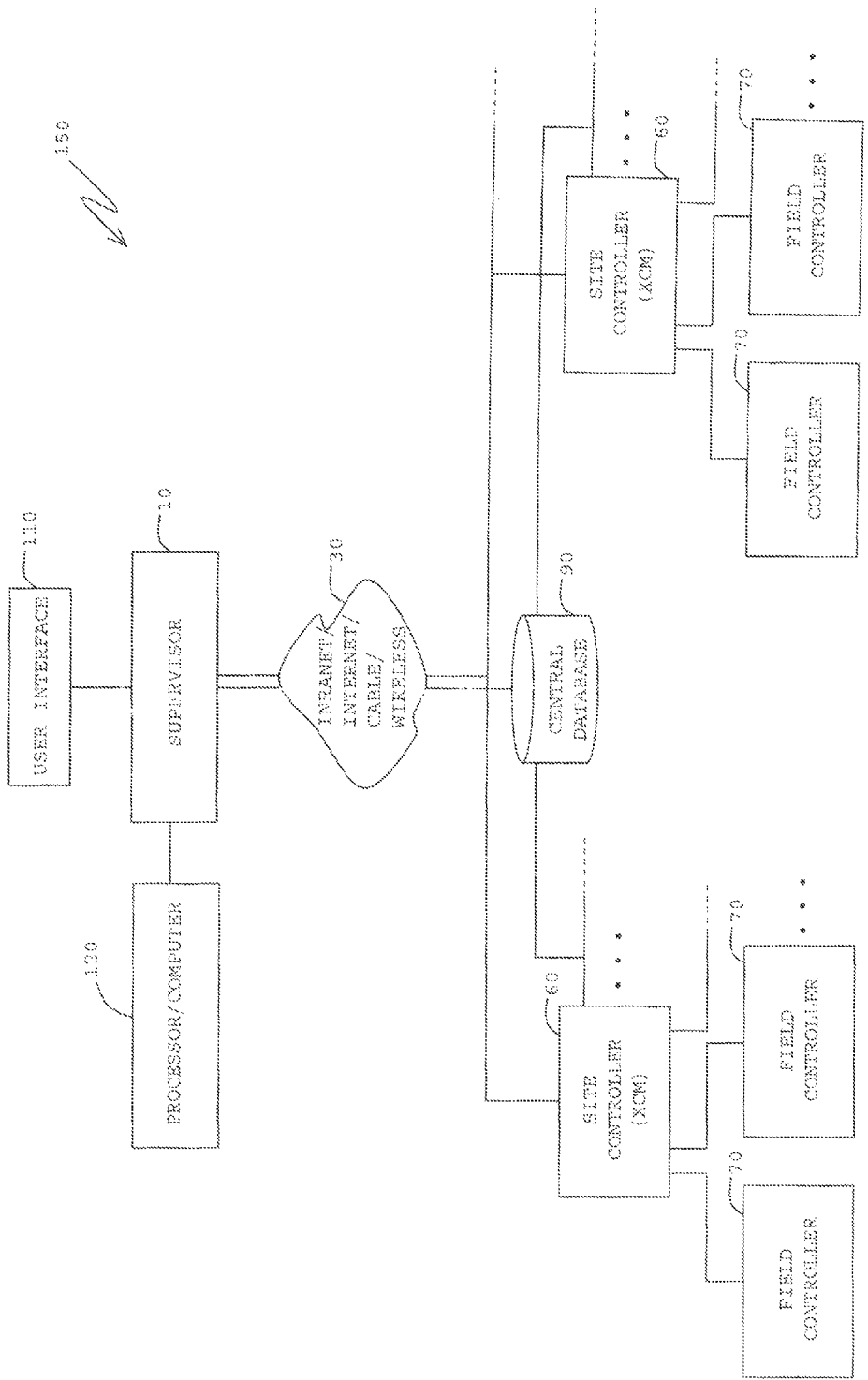
FIG. 1 is a schematic diagram of a supervisor and several levels of controllers.

Opus™ supervisor history view wizard may be noted in the context of a schematic in FIG. 1. FIG. 1 is a schematic of a system 150 which may incorporate a supervisor and several levels of controllers. A user of the Novar™ Opus supervisor 10 may manage and communicate with hundreds or thousands of remote site controllers 60 from a centralized location via intranet, internet, cable and/or wireless media 30. Each of these site controllers 60 may be referred to as an XCM controller 60. The XCM controller 60 may in turn manage and communicate with tens or hundreds of field controllers 70 within the site that perform real-time control of building equipment such as HVAC units, lighting panels and refrigeration circuits. Within the XCM controller 60, point data may be logged into historical archives. The point data might incorporate controller status, input and output states or site energy information. These data may be historical and be periodically transferred from the XCM controller 60 into a central database 90 managed by the Opus supervisor 10. Opus supervisor 10 may have a user interface 110 to allow viewing of this archived historical data. Interface 110 may be used for other purposes relative to supervisor 10. Interface 110 may be utilized for various purposes relative to other components of system 150. A processor/computer 120 may be connected to supervisor 10 for operational and/or other purposes. Processor/computer 120 may also be utilized for various purposes relative to other components of system 150.

A user scenario may be to select a common set of history points from similar controllers from hundreds of sites across an enterprise. For example, a user may want to see zone temperature, return temperature and supply temperature for sales floor roof top unit (RTU) controllers across 100 sites within a particular region. Another example may be viewing energy use data from hundreds of sites in the same view to look for sites operating inefficiently. Additionally, the selected history views may potentially be needed by a user on a daily or weekly basis, depending on operational needs of a business.

The history view selection workflow in Opus and Niagara™ may require the user to browse long lists of site controllers and point lists to select the data points of interest. The existing applications do not necessarily provide any support for saving these selections; so the user may again need to perform the same selection process as needed in the future.

In summary, the following may be regarded as an example of a history viewer. First, a user may have to search through a list of virtually all XCM instances within the enterprise to find desired selections. Second, the user may have to search through a list of virtually all history point instance names within an XCM to find desired selections. Third, the user may not necessarily save history view selections and therefore may need to reselect whenever compelled.

The Novar Opus supervisor is a target application to provide the present approach. A goal of the approach may be an improved way of selecting points of archived history data to view. The approach may improve a user interface workflow of selecting the data points more easily and efficiently. These workflow improvements may be made possible by the site XCM controllers having been configured consistently using the Opus control entity definitions, Opus history extensions, Opus point groups and Opus template features of the Opus supervisor.

The Opus supervisor may provide the user an ability to quickly and efficiently setup history data view selections for viewing a common set of data points from hundreds of sites within the enterprise. The Opus supervisor history viewer may provide for a selection of groups or categories of sites and XCM's within the selected sites by providing group, site category, site and XCM selection boxes. The viewer may allow the user to quickly refine the site XCM selection by filtering by group, site category and refined site list box. Likewise, once the XCM has been selected, the controller selection list may be populated only with unique controller names from the selected XCMs. Once the controllers have been selected, the user may then pick from a short list of unique point group names. Point groups may be general point categories that were assigned to each history point when each individual XCM was configured using the Opus history extensions. This may allow the user to only need to pick a point group named "ZoneTemp" instead of possible hundreds of instances of points with variations of the name "Zone Temperature". At this juncture, the user may elect to save the current selections by name so that the view selections may be re-used without reselecting in the future. Once the desired point groups are selected, the user may proceed to view the historical data for the selected sites, XCM and controller points.

Enhancements of the present history view selection wizard may be summarized in the following. First, the wizard may increase workflow efficiency by narrowing site XCM search with site groups and categories. Second, it may increase workflow efficiency by selection of unique point group names instead of individual points. Third, the wizard may provide features to save selections for reuse of the history view.

To utilize the present Opus history wizard view feature, a configurator user may need to configure the site controllers with specific property settings to enable the history view features. Many of the Novar customers may have common site controller configuration footprints, so the configuration described herein may be done within a few site templates that will in turn be used as a basis for each new site configuration. This may be noted to highlight that the configuration user will not necessarily be overly burdened to set an additional history view configuration in each site controller.

When configuring a site XCM, the configurator may identify each building control subsystem and attach an Opus control entity property identifying such controller with a unique application use name. If the controller is operating a roof top HVAC unit that is supplying conditioned air to the sales floor of the site building, the control entity name may be set to "Sales Floor". These names may be applied using a control entity list control feature allowing the user to re-use previously established names for consistency. This name may be common for virtually all sites and be used uniquely in the controller selection list on the history selection view. Also, the configurator may need to utilize the Opus history extensions on the points to be logged. The Opus history extensions may provide the point group name categorization. The point group name may be applied with a point group list control to allow selection of previously established names for consistency.

When the Opus supervisor imports the histories from the XCM, the imported data may contain the groups, site categories, control entity and point group names. This identifying information may be included with the historical data values in the supervisor database. This may allow an Opus history view wizard to quickly populate the new selection view wizard with the groups, categories, sites, XCM, controller and point groups from an archived data store.

When the user has made virtually all necessary selections for a history view, a name and description of the view may be applied and saved. The saving may allow the user to reuse this view in the future. The saving may be done on the initial creation of the history wizard view setup. Virtually all previously saved view selections may be provided in a list. The user may select a view from the list and immediately render the history data view.

A feature workflow sample may be noted. The user scenario may be to select a common set of history point data from similar controllers from hundreds of sites across the enterprise. For example, the user may want to see the zone temperature, return temperature and supply temperature for the sales floor RTU controllers across 100 sites within a particular region.

In an Opus 5.2 version, with an assumption that the histories are being collected in the Opus supervisor, the user may need to perform the following steps: 1) Navigate to the history node within supervisor station; 2) Search a linear list of 1000's of deployed XCM station nodes to locate the 100 site XCMs of interest (FIG. 1); 3) Expand a site XCM station node; 4) Search a linear list of 100's of history points to locate points of interest (FIG. 2); 5) Drag and drop a point to "Current Charts" window; 6) Return to step 5 for a next point within same site XCM; 7) Return to step 2 for a next point in different site XCM; 8) Press the "Build" button to view virtually all selected points of history data; and 9) When user wants to change the history viewer selections, the user must reset and start over with selecting XCM station nodes and history points.

Dates and times shown in the Figures of the present description are merely for illustrative purposes and do not necessarily represent any actual dates or times.

Figure 2:
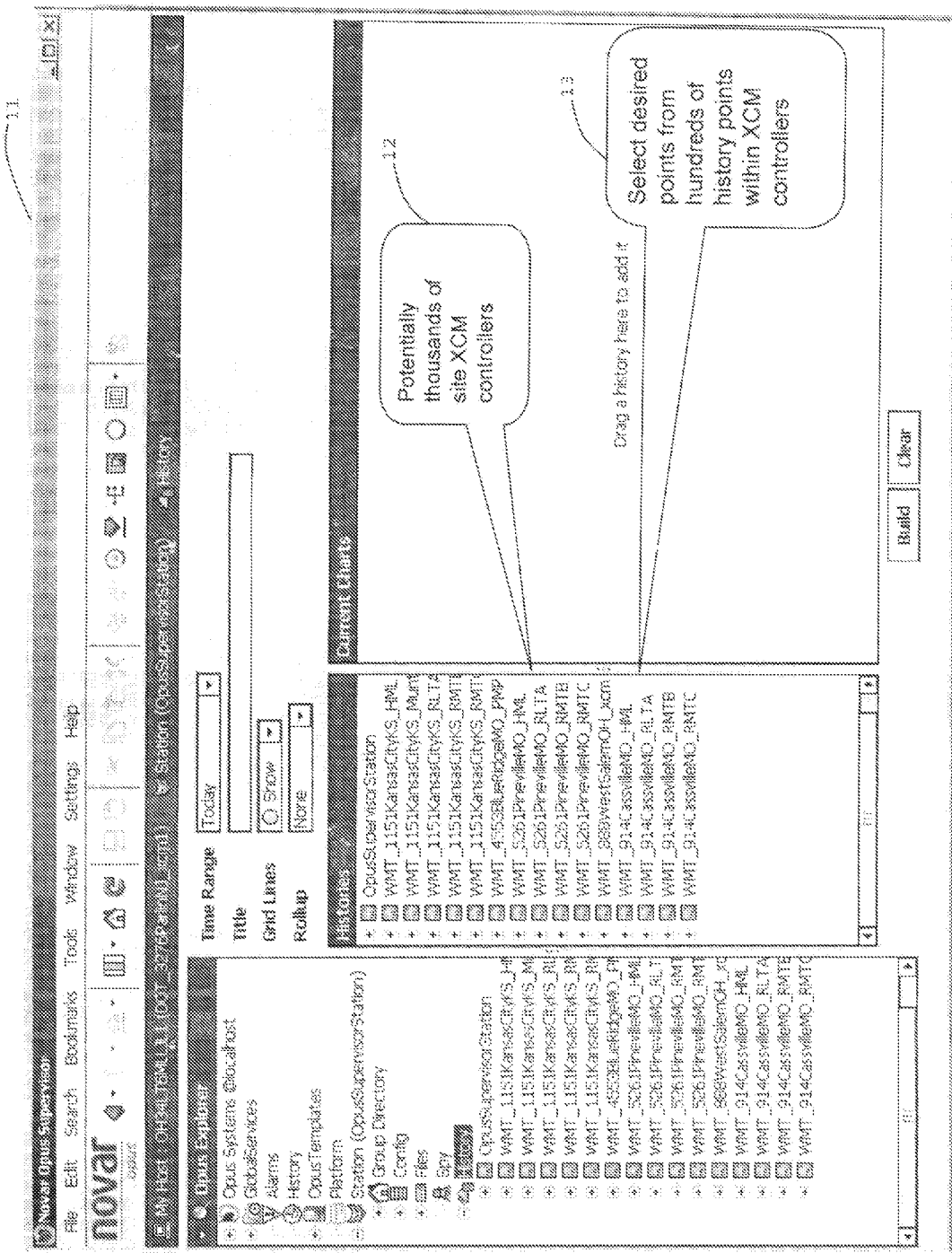
FIG. 2 is a diagram of a screen print of a history selection view.

FIG. 2 shows a screen print 11 of a history view. There may be potentially thousands of site XCM controllers as shown by indication 12. Desired points from hundreds of history points within XCM controllers may be selected, as shown by indication 13.

Figure 3:
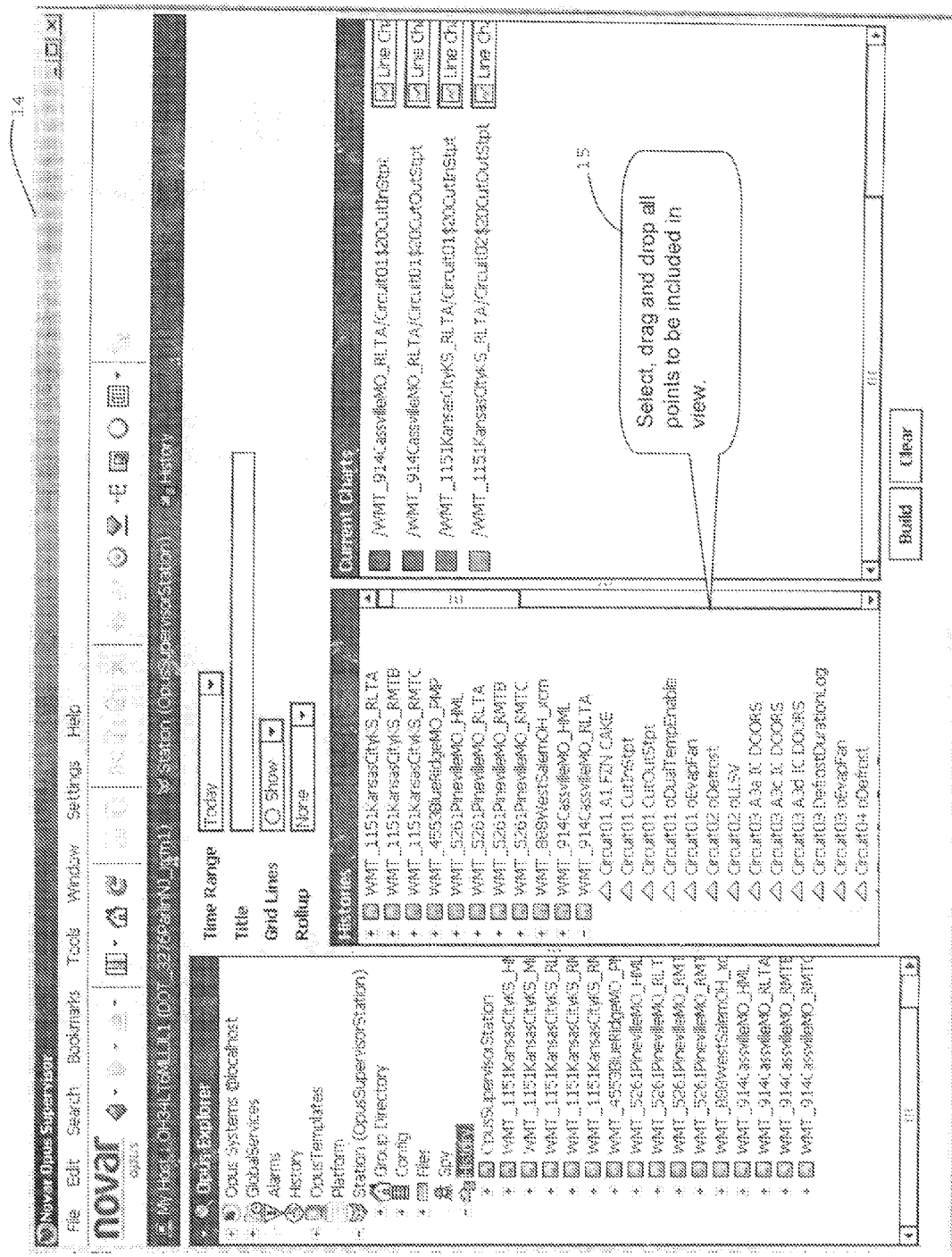
FIG. 3 is a diagram of a screen print of a history selection view.

FIG. 3 shows a screen print 14 of another history view. This view shows that one may select, drag and drop all points to be included in a view, as shown by indication 15.

A user workflow improvement may be made possible by the site XCM controllers having been configured consistently using the Opus controller entity definition, Opus history extensions and Opus template features of the Opus supervisor.

Figure 4:
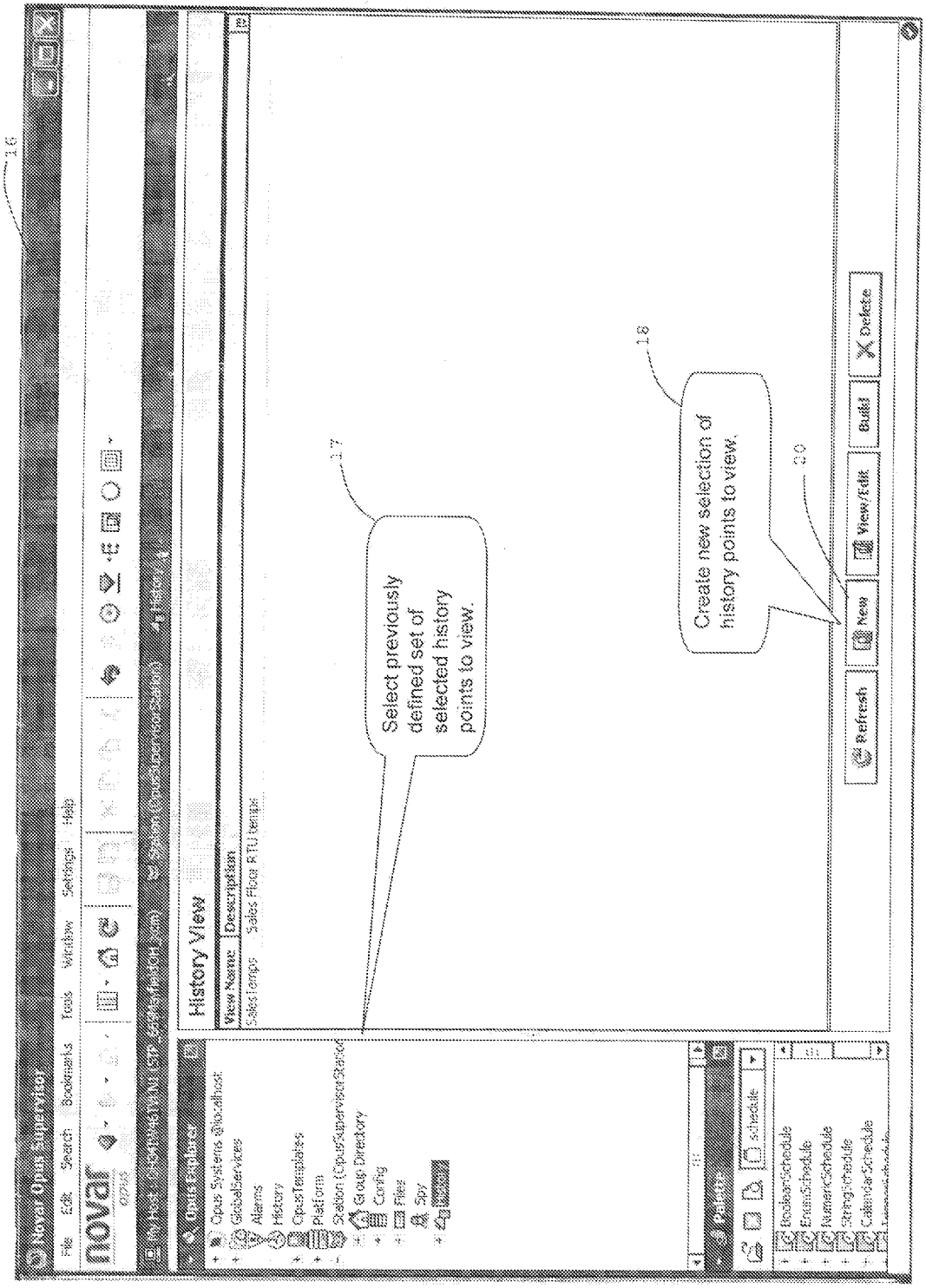
FIG. 4 is a diagram of a history view screen print of a previously saved history view selection setup in which a selected or new history view selection may be created.
Figure 5:
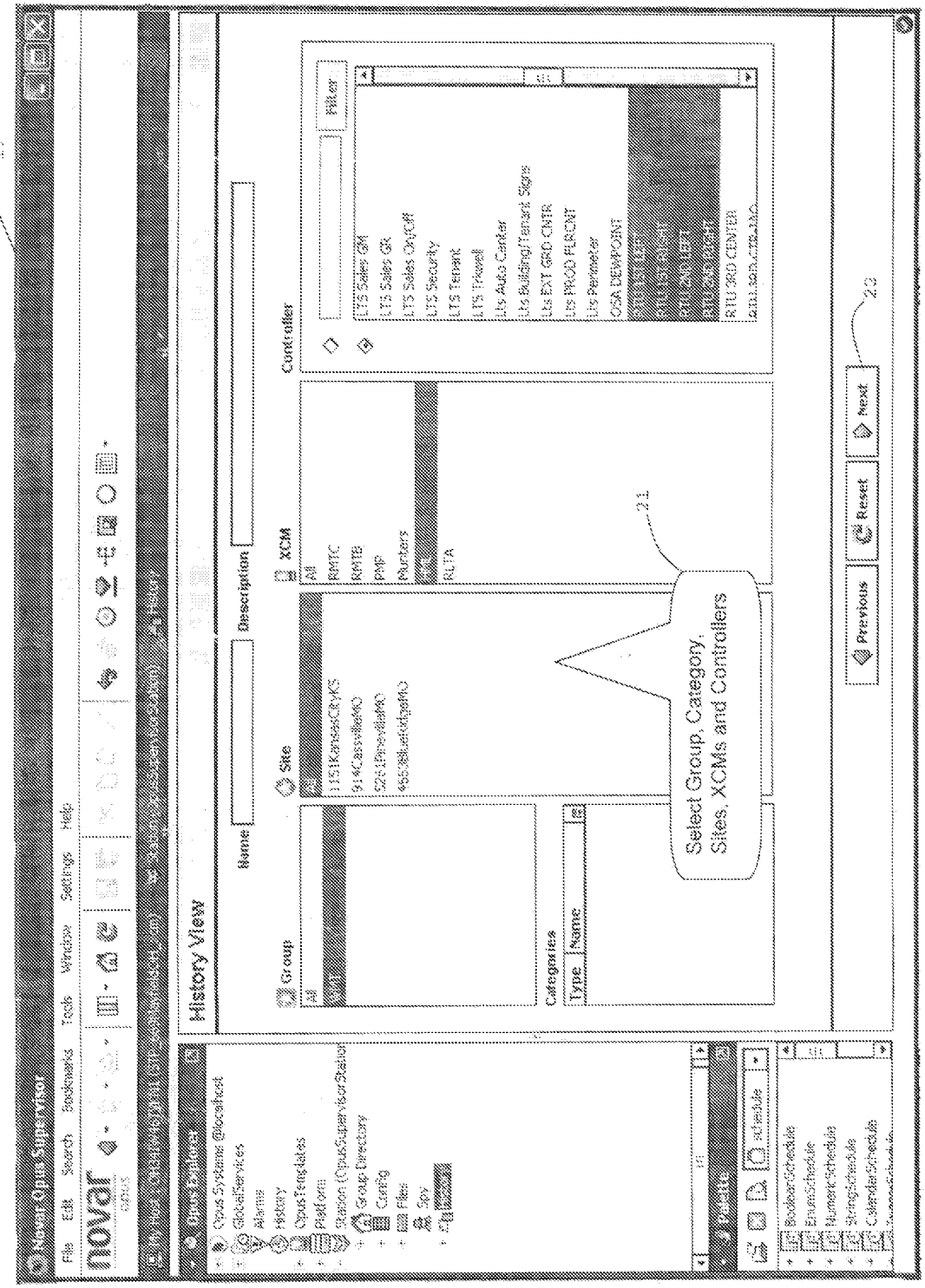
FIG. 5 is a diagram of a history view screen print where a user may select a group, sites, XCMs and controllers.
Figure 6:
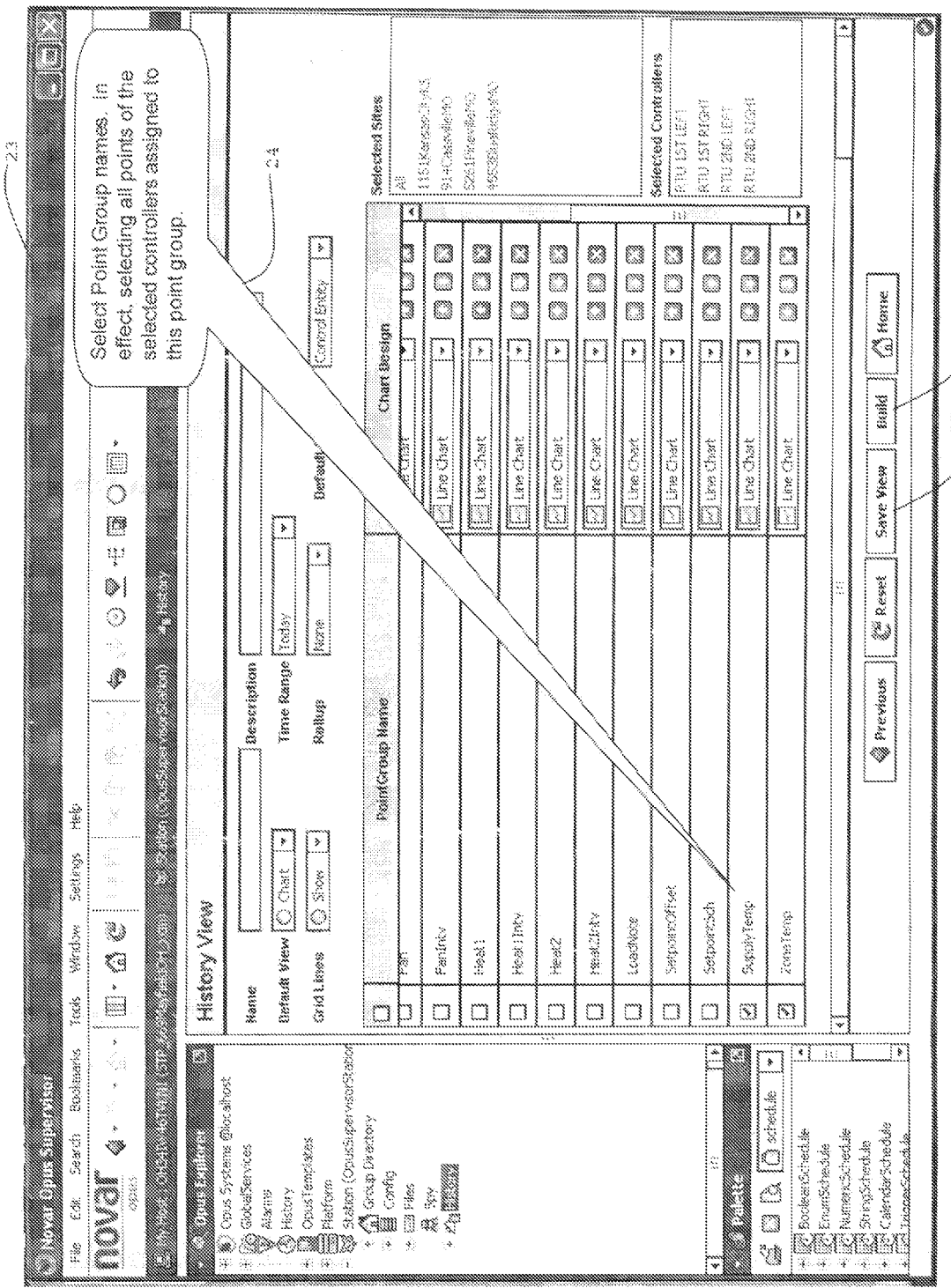
FIG. 6 is a diagram of a history view screen print where the user may select desired history points by selecting the history point group names in which the history point groups are a generalized category of points applied consistently to virtually all points for virtually all controllers across the enterprise.

In an Opus 5.5 version, with an assumption that the histories are being collected in the Opus supervisor, the user may need to perform the following steps: 1) Previously saved history view selection setup may be a selected or new history view selection may be created (note screen print 16 of FIG. 4 with indications 17 and 18); 2) If the user selects a previous setup, the user may select a "Build" button to show history point data for virtually all points selected in setup; 3) If the user selects a New button 20, the view may change (to get screenprint 19 of FIG. 5); 4) The user may select a groups, site categories, site(s), XCM(s) and controller(s) (as with indication 21 of screen print 19 of FIG. 5), and the controller list may only be populated with unique controller names, not necessarily every instance in an enterprise; 5) The user may select a "Next" button 22 to change the view (to get screen print 23 of FIG. 6); 6) The user may select desired history points by selecting the history point group names (as shown by indication 24 of screen print 23), where the history point groups are a generalized category of points applied consistently to virtually all points for virtually all controllers across the enterprise; 7) The user may elect the "Save View" button 25 to save the selections by name to be used again in future; and 8) The user may select the "Build" button 26 to view virtually all selected points of history data.

An Opus supervisor history table view may be looked at. A user scenario may be to view and report historical data from a common set of history points in a multi-point tabular view. A tabular view may allow visual comparison of multiple points of data logged at the same time. Also, the user may want to generate the report by exporting to either a PDF (portable document format) or CSV (comma-separated values) file format with virtually all of the point data in the table. For example, the user may want to generate a report of the zone temperature and supply temperature for the sales floor RTU controllers across 100 sites within a particular region. Another example may be an energy use report from hundreds of sites within a region to look for sites operating inefficiently. Once the multi-point data are put into a CSV file, a spreadsheet tool may be utilized to analyze and provide enhanced reporting. The current history table view support in Opus and Niagara may be limited to only viewing a single point of data in the table and subsequently to only providing this single point in the exported report file.

In summary, the limitations with the related art history viewer may include the following: 1) The history viewer may only support a single point included in a tabular view; 2) The user may only generate a report export to PDF and CSV with a single point of data; and 3) To compare data from multiple points, the user should manually combine multiple data exported to CSV.

Figure 7:
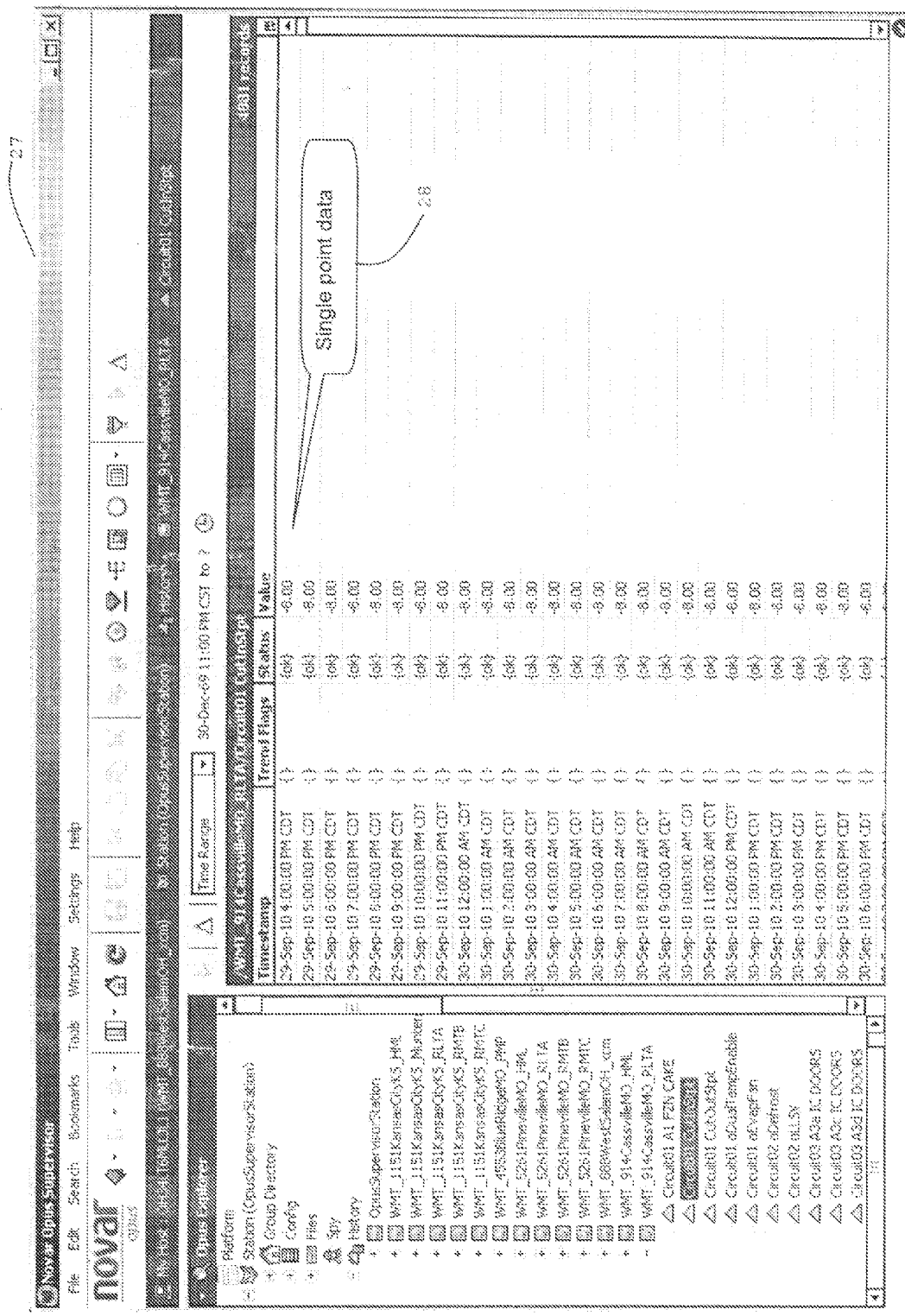
FIG. 7 is a diagram of a screen print of an existing history view where an example of single point data may be shown.
Figure 9:
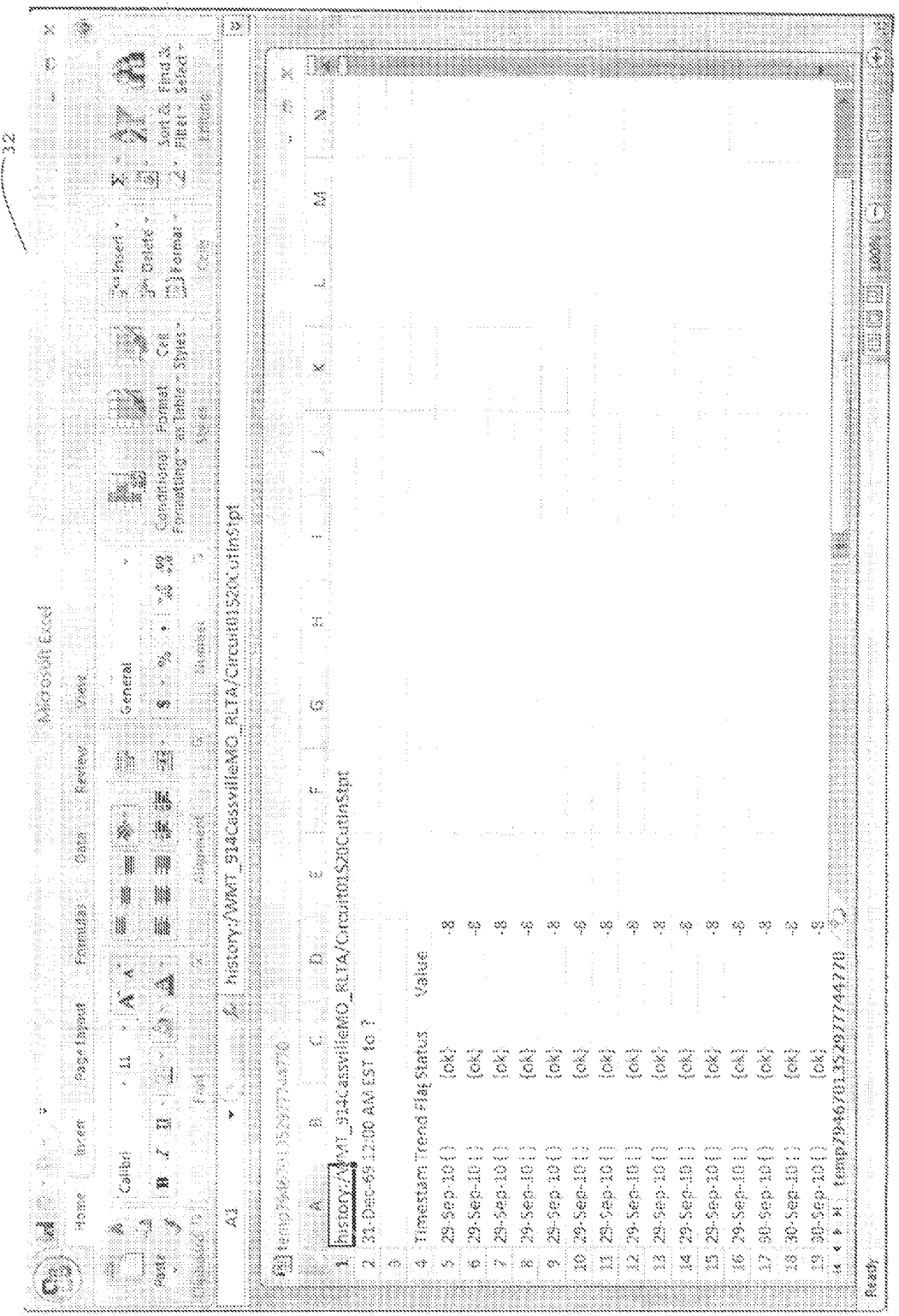

In an Opus 5.2 version, the user may be provided with a history table view and export in FIGS. 7-9. An assumption may be that the histories are being collected in the Opus supervisor. An example of single point data may be shown by an indication 28 in screen print 27 of FIG. 7. FIGS. 7, 8 and 9 may refer to items 1, 2 and 3, respectively, of the noted limitations. Screen print 27 of FIG. 7 may be regarded as an existing history view and screen print 31 of FIG. 8 may be regarded as an existing history export PDF. Screen print 32 of FIG. 9 may be regarded as an existing export CSV.

The present Opus supervisory history view wizard may have a direct relationship to the Opus supervisor history table view. The Novar Opus supervisor may be the target application to provide the present approach. This Opus supervisor enhancement may be an improved approach of viewing and reporting the archived history data in a multi-point table view. This enhanced multi-point table view is the present topic. The multi-point chart view may already be available in the existing Niagara and Opus supervisor workbench applications.

The user may select history points for viewing from one or more site controllers. Once the desired point groups are selected, the user may proceed to view the historical data for the selected sites, XCM, controller points in either the existing multi-point chart view or a new multi-point table view. Once the data have been rendered in the view, the user may, with a single button press, switch between the chart and table view.

Additionally, the user may select a "stacking" option for the table view. The choices may incorporate the default "control entity", "XCM" or "site" stacking choices. These options may define the orientation of the data within the table. For example, if the selection was the zone temperature and supply temperature from the Garden Center and Auto Center RTU's within two sites, the corresponding samples of the three stacking options may be revealed in FIGS. 10-12, respectively.

These stacking options may allow point data values to be pivoted to allow time stamped data values to be oriented on the same row for easier comparison and evaluation. These options may permit greater flexibility in analyzing runtime operations.

Enhancements of the present multi-point table view may be summarized by the following: 1) Multiple point data in a single table view; 2) Adjustable stacking option to pivot data providing improved data analysis; 3) Quick Chart/Table view navigation; and 4) Multiple point report exports to PDF and CSV formats.

To utilize the Opus history wizard view feature revealed herein, a configurator user may have to configure the site controllers with specific property settings to enable the history view features. Many of the Novar customers may have common site controller configuration footprints, so the configuration noted herein may be done within a few site templates that can in turn be used as a basis for each new site configuration. This approach may highlight a notion that the configuration user will not necessarily be overly burdened to set additional history view configurations in each site controller.

When configuring a site XCM, the configurator may identify each building control subsystem and attach an Opus control entity property identifying this controller with a unique application use name. If the controller is operating a roof top HVAC unit that is supplying conditioned air to the sales floor of the site building, then the control entity name may be set to "Sales Floor".

The Opus supervisor may be configured to periodically import the history data from the site XCM controllers to a centralized history database. The user may utilize the Opus supervisor multi-site history view wizard to select the enterprise groups, categories, sites, XCM controllers and points to view. When selecting the points to include for the history view, the user may also set the table stacking option. Once these settings are complete, the user may proceed to a new history table view. Once the table view has rendered the data, the user may elect to export to either a PDF file or a CSV file using the export option. The user may also quickly switch the view to the chart view. The user may also choose to back up to the point selection screen to change points or time period ranges to include in the view. One may note Figures for existing history table view and new feature history table view samples.

Figure 10:
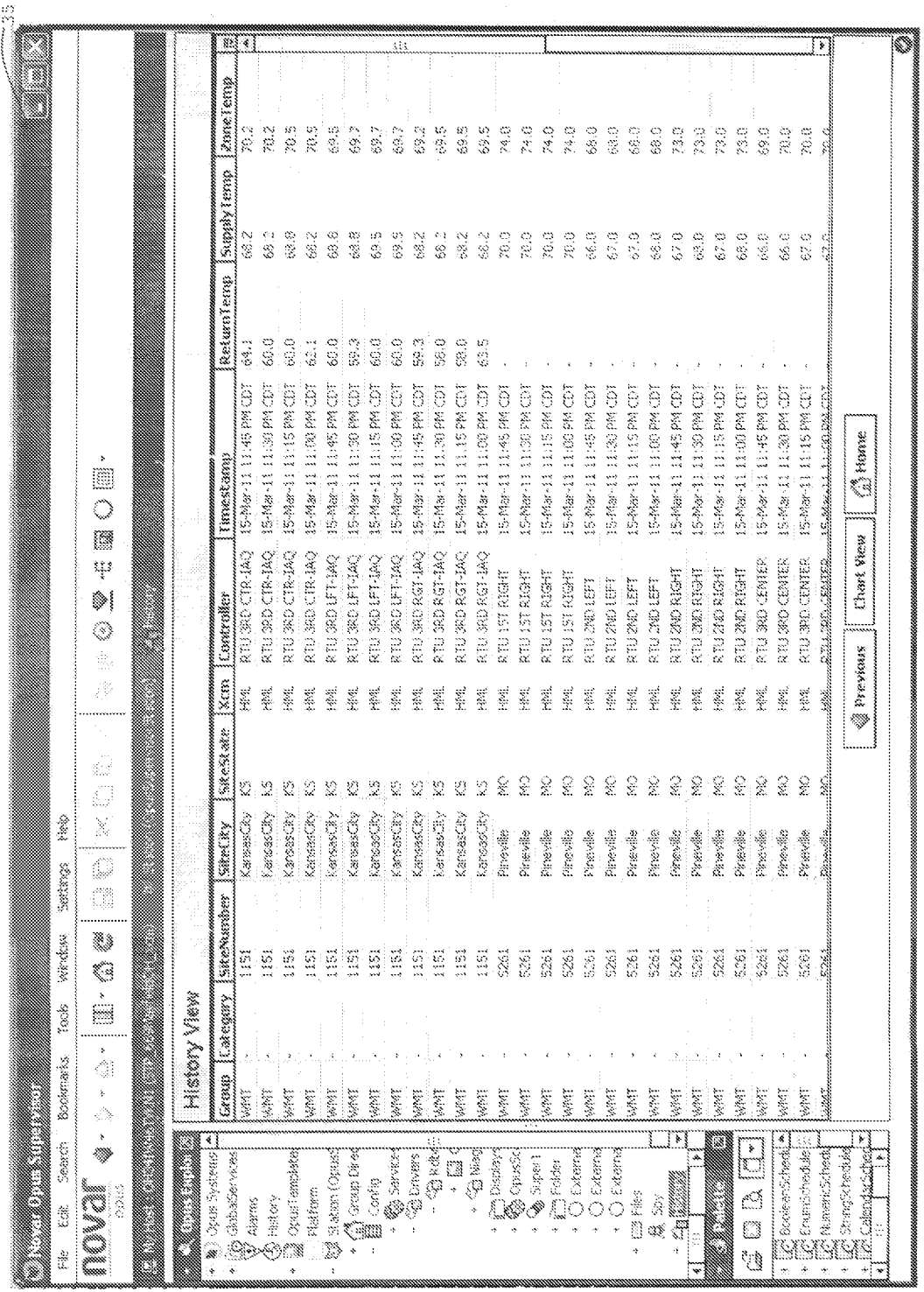
FIG. 10 is a diagram of a screen print revealing a history view with control entity stacking.
Figure 11:
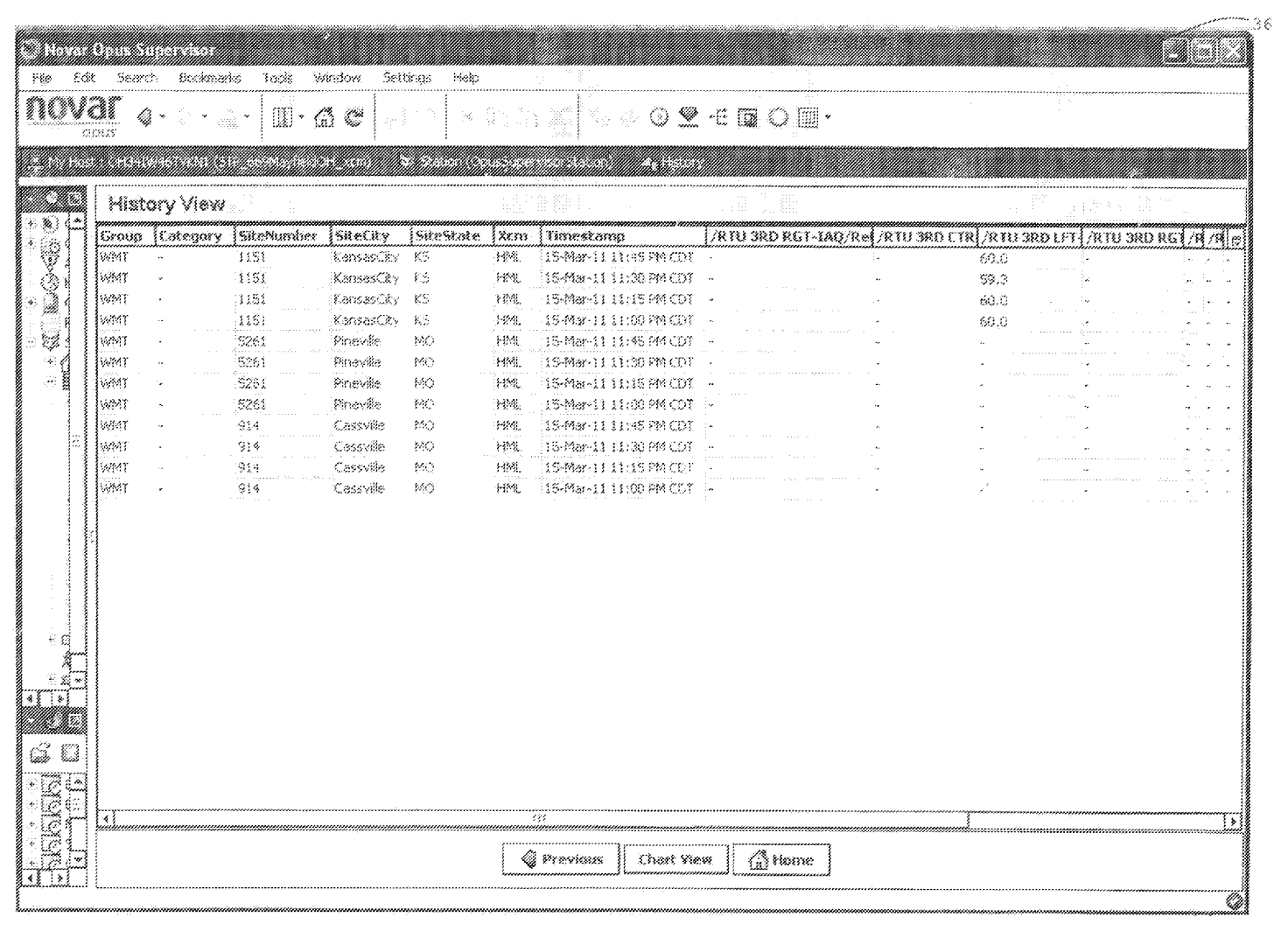
Figure 12:
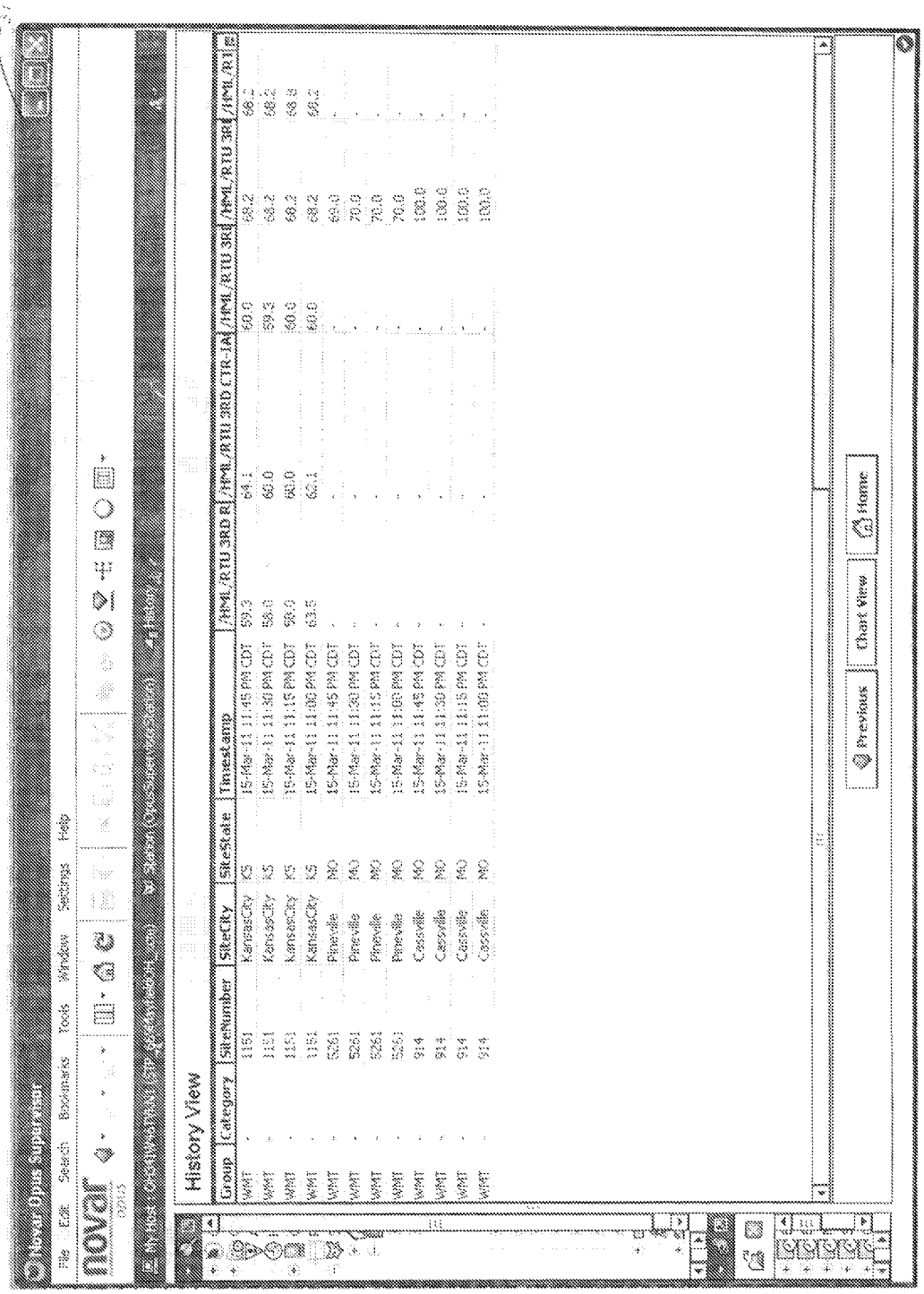
FIG. 12 is a diagram of a screen print revealing a history view with site stacking.

In an Opus 5.5 version, the user may be provided with the following history table views and exports in FIGS. 10-17. FIG. 10 is a screen print 35 revealing a new history view with control entity stacking. FIG. 11 is a screen print 36 revealing a new history view with XCM stacking. FIG. 12 is a screen print 37 revealing a new history view with site stacking.

Figure 13:
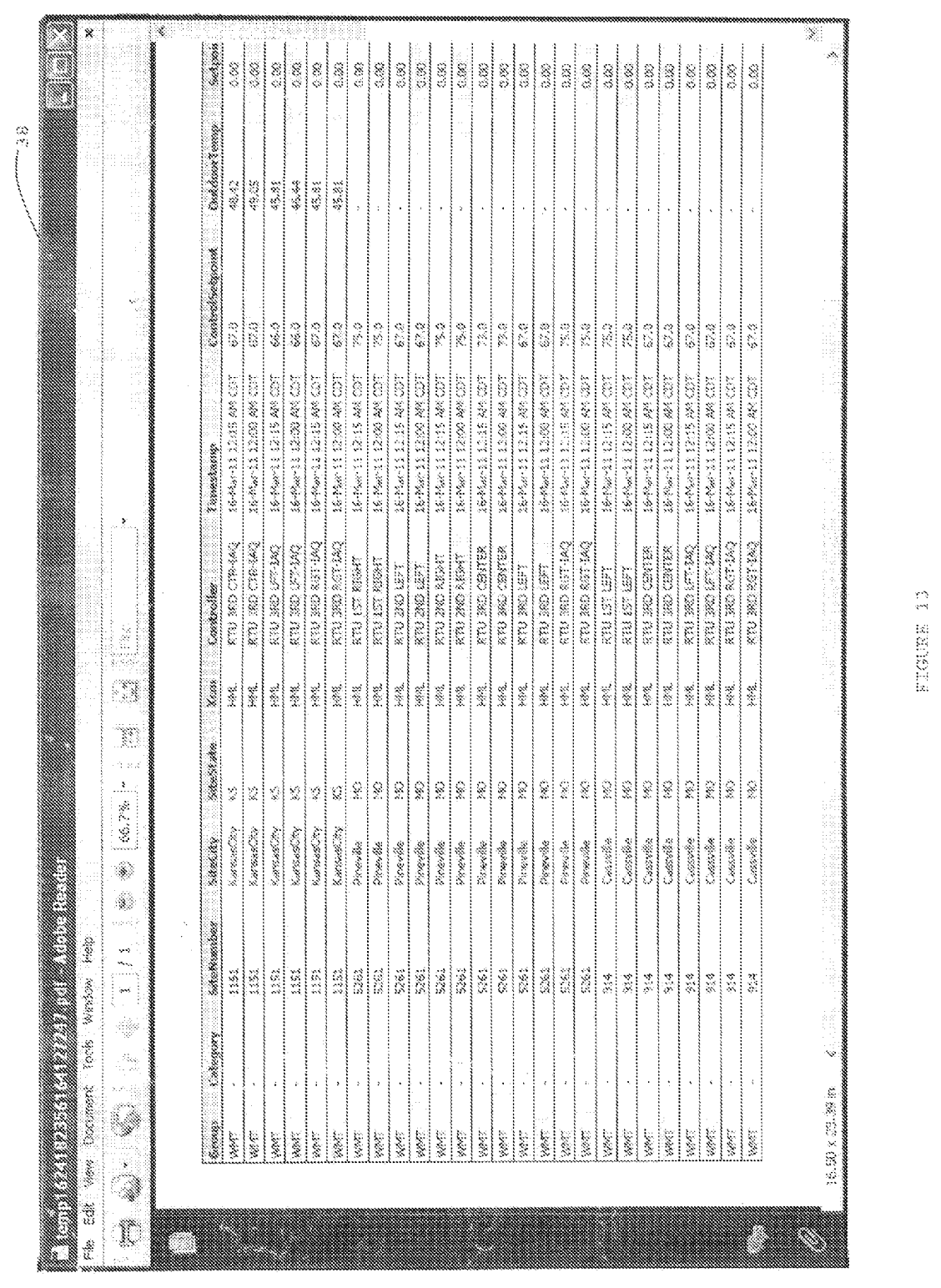

FIG. 13 is a screen print 38 revealing a new history export PDF. FIG. 14 is a screen print 39 revealing a history export CSV. FIG. 15 is a screen print 40 revealing control entity stacking. FIG. 16 is a screen print 41 revealing XCM stacking. FIG. 17 is a screen print 42 revealing site stacking.

Figure 18:
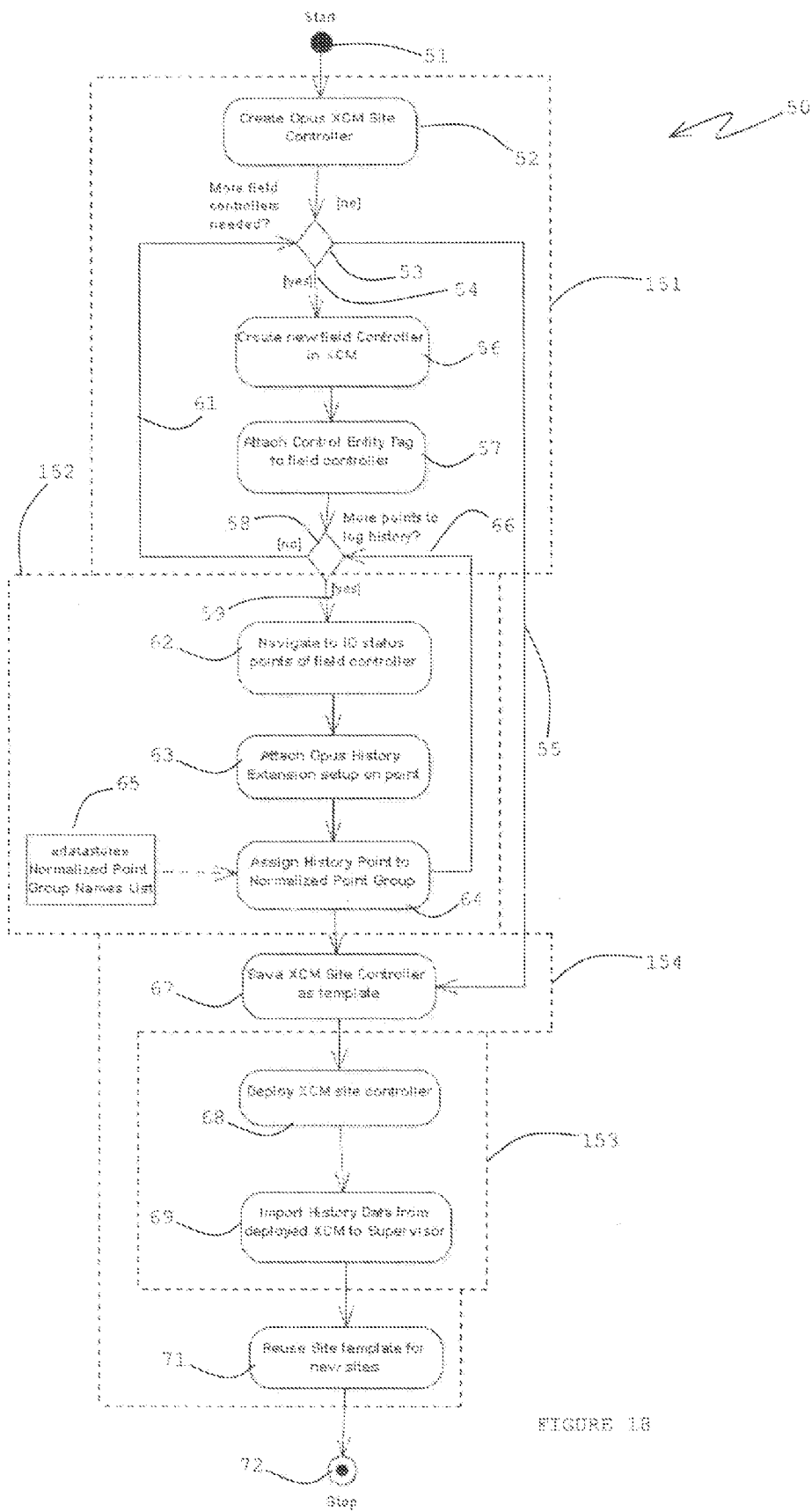
FIG. 18 is a flow diagram for a history point setup.

FIG. 18 is a flow diagram 50 for providing a history point setup. A symbol in the diagrams herein may represent a step, block, action, and/or the like. A start may begin at point 51 and then create an Opus XCM site controller at symbol 52. After symbol 52, a question of whether more filed controllers are needed may be asked at symbol 53. If the answer is yes, then a new field controller in XCM may be created at symbol 56. A control entity tag may be attached to the field controller at symbol 57. At symbol 58, a question of whether more points are to be added to a log history. If the answer is no, then a return along line 61 to the question at symbol 53 of whether more field controllers are needed may be asked. If the answer is no, then a move along line 55 to symbol 67 may occur where an XCM site controller is saved as a template.

If the answer to the question whether more points are to be added to the log history is yes at symbol 58, then a move along line 59 may occur where navigation to IO status points of the field controller is made at symbol 62. At symbol 63, an Opus history extension may be setup on a point. A history point may be assigned to a normalized point group at symbol 64. A data store at symbol 65 may provide a normalized point group names list to symbol 64. A return along line 66 from symbol 64 to symbol 58 may be made if more points are to be made to the log history. If so, the approach through symbols 62-64 may be again followed. If no more points are to be added, then an XCM site controller may be saved as a template at symbol 67. Then at symbol 68, the XCM site controller may be deployed. History data from the deployed XCM may be imported to a supervisor at symbol 69. The site template may be reused for new sites at symbol 71. The approach may end at point 72.

Flow diagram 50 has items which may be placed into stages 151, 152, 153 and 154. The items indicated in symbols 52, 53, 56, 57 and 58 are of stage 151 which may involve creation of a site controller configuration inclusive of field controllers. An assignment of control entity tags (at symbol 57) may be pre-requisite for a new Opus history viewer operation.

The items indicated in symbols 62, 63, 64 and 65 are of stage 152 which may involve a history point setup. All points to be available in a new Opus history view may need to have history extensions and have to be assigned to a normalized point group. This may assure similar points from multiple sites and field controllers can be easily referenced by a single point name. This may be a pre-requisite for a new Opus history viewer operation.

The items indicated in symbols 68 and 69 are of stage 153 which may involve history data import. A new Opus history viewer may be an Opus supervisor function. Virtually all history data to be accessible by the viewer may need to be pulled into the supervisor data base from the site controllers. This may be a prerequisite for a new Opus history viewer.

The items indicated in symbols 67 and 71 are of stage 154 which may involve a site controller template. Creation and reuse of site templates may facilitate reuse of a common configuration from one site to the next site. This is not necessarily a prerequisite for a new Opus history viewer.

Figure 19:
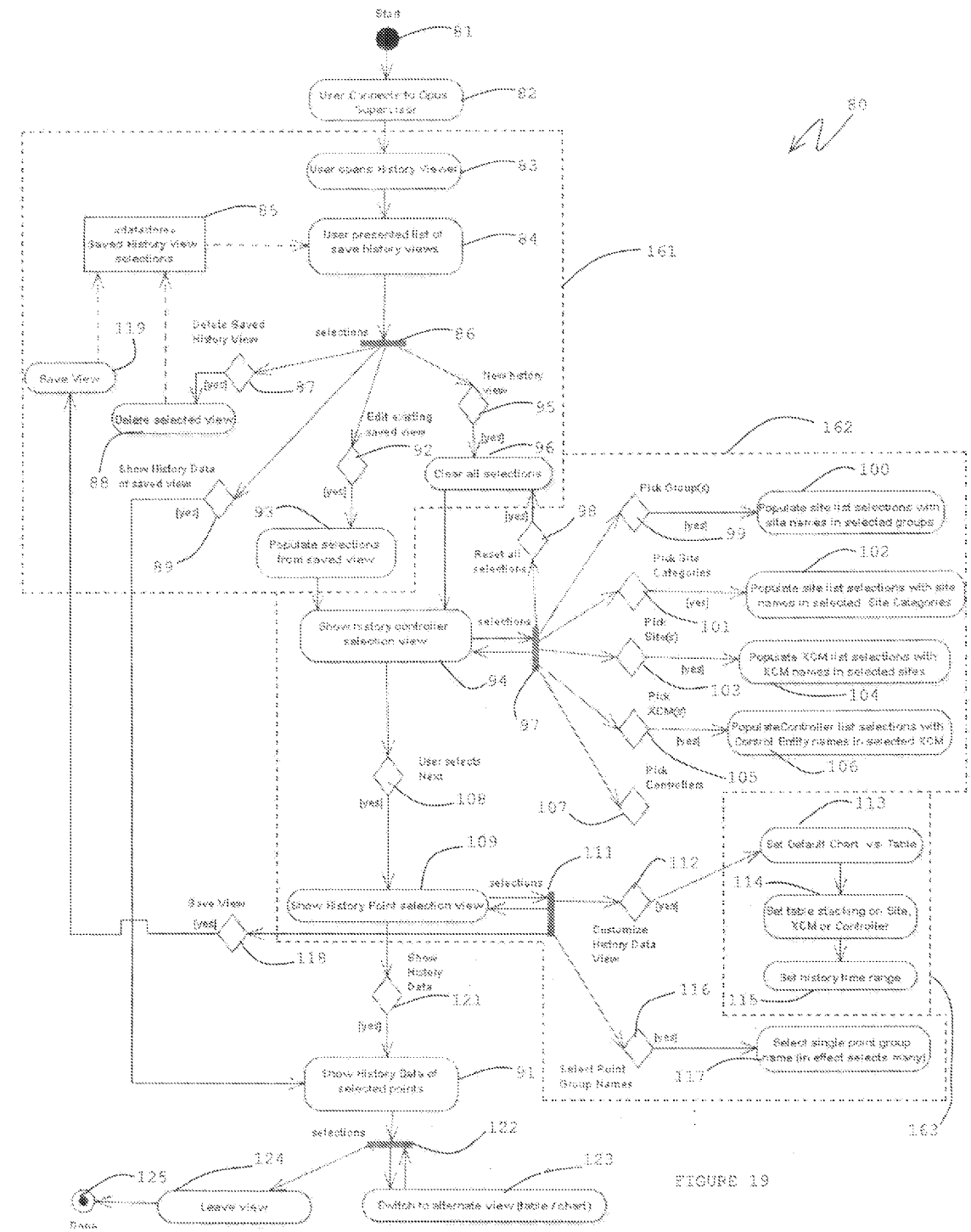
FIG. 19 is a flow diagram for a history view setup.

FIG. 19 is a flow diagram 80 for a history view setup. An approach may begin at point 81 and go to a symbol 82 where a user may connect to an Opus supervisor. At symbol 83, the user may open a history viewer. The user may be presented with a list of save history views at symbol 84. A data store may have saved history view selections available to be present to the user at symbol 84. Selection of questions may be selected at symbol 86 relative to one or more history views. One question may involve whether a saved history view should be deleted at symbol 87. If so, then the selected view may be deleted at symbol 88 which is indicated at the data store 85. Another question at symbol 89 may involve whether history data of a saved view are to be shown. If so, they may be shown as history data of selected points at symbol 91. Still another question that may be asked at symbol is whether an existing saved view is to be edited. If so, then selections from the saved view may be populated at symbol 93. They may go to symbol 94 where a history controller selection view is shown. Yet another question that may be asked at symbol 95 is whether there is to be a new history view. If so, then all of the selections may be cleared at symbol 96. After clearing the selections, the approach may continue at symbol 94 where the history controller selection view is shown. Selections may be made from symbol 94 at symbol 97. First, a question may be whether all selections are to be reset at symbol 98. If so, then the result may go to symbol 96 entitled clear all selections. A question at symbol 99 is whether one or more groups are to be picked. If so, then site list selections are to be populated with site names in selected groups at symbol 100. A question at symbol 101 may be whether site categories are to be picked. If so, then site list selections may be populated with site names in selected site categories at symbol 102. A question at symbol 103 is whether one or more sites are to be picked. If so, then XCM selections may be populated with XCM names in selected sites at symbol 104. A question at symbol 105 is whether one or more XCMs are to be picked. If so, then controller list selections may be populated with control entity names in selected XCMs. At symbol 107, controllers may be selected. Information about selections may be provided from symbol 97 to symbol 94. Following symbol 108, a question 108 of whether a user selects next may be indicated at symbol 108. If so, then symbol 109 may follow indicating to show a history point selection view. Selections may be made at symbol 111. A question of whether to customize a history data view may be asked at symbol 112. If so, then a default chart versus a table may be set at symbol 113. Then table stacking may be set on a site, XCM or controller at symbol 114, and at symbol 115 a history time range may be set. Again from symbol 112, a question of whether point group names are to be selected at symbol 116. If so, then a single point group name may be selected at symbol 117. In effect many may be selected. Again from symbol 111, a question whether the view is to be saved may be asked at symbol 118. If so, then the view may be saved from symbol 119 to symbol 85 with the data store for saved history view selections. That a selection is made may be provided to symbol 109 where the history point selection view may be shown. A question of whether history data is to be shown may be asked at symbol 121. If so, then history data of selected points may be shown at symbol 91. Selections may then be made at symbol 122 of switching to an alternate view (table/chart) at symbol 123 or leaving the view at symbol 124. If the latter is selected, then the approach may be done at point 125.

Flow diagram 80 has items which may be placed into stages 161, 162 and 163. The items indicated in symbols 83, 84, 85, 86, 87, 88, 89, 92, 93, 95, 96 and 119 are of stage 161 which may involve a management of history views. A user may add, change or delete view selectors for future reuse.

The items indicated in symbols 94, 97, 98, 99, 100, 101, 102, 103, 104, 105, 106, 107, 108, 109, 111, 112, 113, 114, 115, 116 and 117 are of stage 162 which may involve history point view selection. A user may select groups of sites, sites, site controllers and field controllers to be viewed together in a common history view. Selects may be cascaded so when a group is selected, only sites for this group are presented for further selection. The same may proceed for the site controller and field controllers. Based on the field controllers selected, the user may be provided a list of common point groups.

The items indicated in symbols 113, 114 and 115 are of stage 163 which may involve a history view configuration. A user may configure a view to a preferred view type, data orientation and time range.

Figure 20:
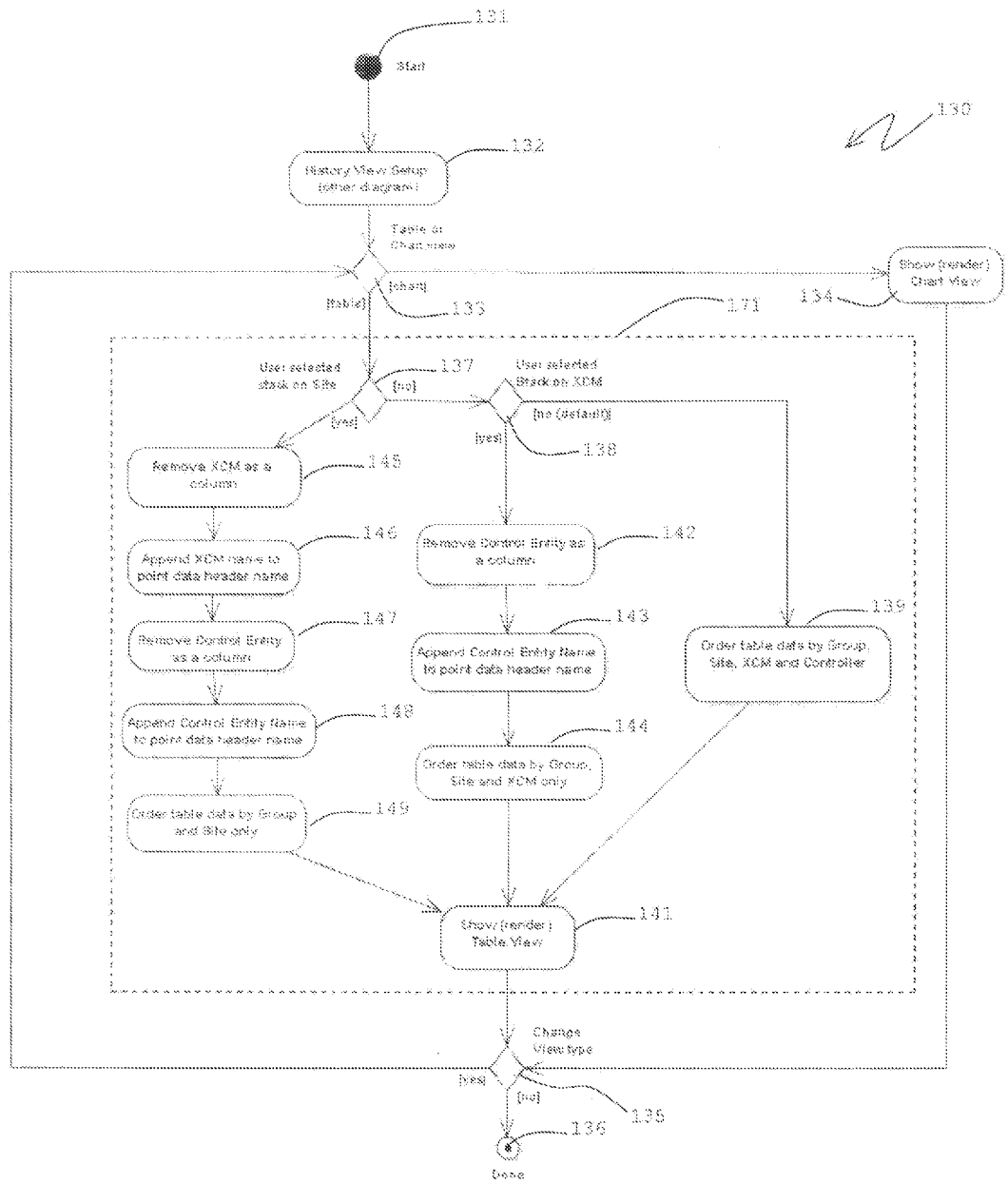
FIG. 20 is a flow diagram for history table viewing.

FIG. 20 is a flow diagram 130 for history table viewing. An approach may start at point 131 and go to a symbol 132 which represents may be another diagram such as a history view setup in diagram 80 of FIG. 19. At symbol 133, there may be a table or chart view of an output of a diagram noted in symbol 132. For example, in the history view setup of diagram 80 at symbol 91, there may be history data of selected points presented in a table or chart. A switching or selection of the table or chart may be made at symbol 123 of diagram 80. If a chart view is shown or tendered at symbol 133 as indicated at symbol 134, then the view type may be changed at symbol 135. If the view is not changed, then the approach may be done as indicated at point 136. If the view type is changed from a chart to a table at symbol 135, the one may go to symbol 133 where the view type is a table. With the table view, a question may be asked at a symbol 137 as to whether the table view is a user selected stack on site. If not, then a question may be asked at a symbol 138 as to whether the table view is of user selected stack on an XCM. If the answer is no, then at symbol 139 (which is a default response of stack on controller to the question at symbol 138) the table data may be ordered by group, site XCM and controller. A resulting table may be shown or rendered at symbol 141. At symbol 135, the question of whether to change the view type may be asked. If the view type is changed from the table to chart then a return to symbol 133 may be made. If not, then the approach may stop at point 136.

Back to symbol 138, if an answer to whether there is a user selected stack on an XCM is yes, then the control entity may be removed as a column at symbol 142. To follow, the control entity name may be pre-pended to the point data header name. Table data may then be ordered by group, site and XCM at symbol 144. The order may be even be only by group, and site and XCM. The table view from symbol 144 may be shown or rendered at symbol 141. If the view type is not changed at symbol 135 following symbol 141, the approach may be done at point 136.

Back to symbol 137, if the answer to whether the user selected a stack on site is yes, then the XCM may be removed as a column at symbol 145. Then the XCM name may be pre-pended to the point data header name at symbol 146. The control entity may be removed as a column at symbol 147 and be pre-pended to the point data header name at symbol 148. Table data may then be ordered by group and site at symbol 149. The order may be even be only by group and site. The table view from symbol 149 may be shown or rendered at symbol 141. If the view is changed at symbol according to symbol 135, then a return to symbol 133 may be made. If not, then the approach may be done at point 136.

Flow diagram 130 has items that may be placed into a stage 171. The items indicated in symbols 137, 138, 139, 141, 142, 143, 144, 145, 146, 147, 148 and 149 are of stage 171 which may involve history table view stacking. A user may configure a desired orientation of the data as shown in a tabular view. Based on this selection, the view may render the same data oriented by the field controller, the site controller, or the site.

Items or activities of the present system shown in FIGS. 1-20 and described by the text herein may be covered or performed by one or more processors/computers.

The following is a recap of the present supervisor history view wizard An approach for providing a supervisor history view may incorporate providing one or more site controllers connected to a supervisor, providing one or more field controllers connected to the one or more site controllers, assigning control entity tags to the one or more field controllers, making points available from the field controllers, setting up the points for referencing, importing history data from the points into a database of the supervisor, and providing a supervisor history view of the history data.

The approach may further incorporate managing the history view, creating a history point view, configuring the history view, selecting a history view, and/or deleting a history view.

The setting up the points for referencing may incorporate applying a history extension to each of the points, and assigning each of the points to a normalized group. Similar points from multiple sites and/or field controllers may be referenced by a single point group name. The importing the history data from the points into the database of the supervisor may make the history data accessible by a viewer. Managing a history view may incorporate adding, changing or deleting selections of the history view. The selecting a history point view may incorporate selections according to groups of sites, categories of sites, site controllers, and/or field controllers for viewing in a common history view.

The selections may be cascaded so that when a group or site category is selected, just sites for the group or category selected are presented for further selection. The selections may be cascaded so that when a site is selected, just site controllers for the sites selected are presented for further selection. Or the selections may be cascaded so that when a site controller is selected, just field controllers for the site controller selected are presented for further selection. A user may select unique entity names for field controllers to select field controllers from the one or more site controllers. Based on the field controllers selected, the user may be provided a list of common point groups.

Configuring the history view may incorporate configuring the history view to a desired view type, data orientation and/or a time range. Selecting a setup of the history view may incorporate selecting a table or chart view. If the chart view is selected, then stacking the history view may be done according to a field controller, a site controller or a site.

A supervisor history viewer may incorporate a supervisor, one or more site controllers connected to the supervisor, and one or more field controllers connected to at least one of the one or more site controllers. Each field controller may incorporate a control entity tag and one or more points. Each point may have a history extension. Each point may be assigned to a normalized point group.

Similar points from one or more field controllers may be referenced by one point group name of the normalized point group. The one or more points may provide historical data. The historical data may be provided to a database of the supervisor. The historical data may be accessible in a form of view selections from the supervisor.

The view selections may be added to, subtracted from, changed or deleted. The view selections may be configurable according to view type, data orientation and time range. The view selections may be stackable oriented by field controller, site controller or site. Sites, site controllers and field controllers may be viewable as view selections of a common history view.

The view selections may be cascaded so that when a group or site category is selected, just sites for the group or category selected are presented for further selection. The view selections may be cascaded so that when a site is selected, just site controllers for the sites selected are presented for further selection. The view selections may be cascaded so that when a site controller is selected, just field controllers for the site controller selected are presented for further selection.

A supervisory viewer approach may incorporate providing a supervisor, one or more site controllers and one or more field controllers, assigning a control entity tag to each field controller, navigating to one or more status points of each field controller, attaching a supervisor history extension to each point, and assigning each point with a name to a normalized point group to ensure that similar points from multiple sites and field controllers are referenced by a single point group name in a normalized point group name list.

Status points may provide history data which are conveyed from a respective field controller to a respective site controller. The history data may be pulled from the site controllers into a database of the supervisor. A history view may be based on history data from the database of the supervisor.

The approach may further incorporate selecting groups of sites, site controllers and field controllers to be viewed in a common history view. Each field controller of the one or more field controllers may be connected with a site controller. A unique name may be assigned to each field controller of a site controller. Field controllers may be selected from selected site controllers according to names of the field controllers. A list of common point groups may be provided on a basis of the filed controllers selected. The approach may further incorporate configuring the history view to view type, data orientation and time range, or stacking data in the history view according to a presence or absence of a group, site, site controller and/or field controller.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A method for providing a supervisor history view of data related to field controllers configured to control building equipment, the method comprising:
   providing one or more site controllers connected to a supervisor, the supervisor having a user interface;
   providing one or more field controllers connected to the one or more site controllers, wherein the field controllers are configured to control building equipment;
   assigning control entity tags to the one or more field controllers at the user interface of the supervisor;
   making data points from the field controllers available at the supervisor;
   setting up the data points for referencing;
   importing history data from the data points into a database of the supervisor;
   providing a supervisor history view of the history data; and
   assigning, at the supervisor, each point with a name to a normalized point group of a plurality of normalized point groups to ensure that similar points from multiple sites and field controllers are referenced by a single point group name in a normalized point group name list, wherein at least one point is assigned to a first normalized point group and at least one other point is assigned to a second normalized point group different than the first normalized point group.

2. The method of claim 1, further comprising:
   managing the history view;
   creating a history point view;
   configuring the history view;
   selecting a history view; and/or
   deleting a history view.

3. The method of claim 2, wherein configuring the history view comprises configuring the history view to a desired view type, data orientation and/or a time range.

4. The method of claim 2, wherein:
   selecting a setup of the history view comprises selecting a table or chart view; and
   if the chart view is selected, then stacking the history view can be done according to a field controller, a site controller or a site.

5. The method of claim 1, wherein the setting up the data points for referencing comprises:
   applying a history extension to each of the data points; and
   assigning each of the data points to a normalized group; and
   wherein similar data points from multiple sites and/or field controllers are referenced by a single point group name.

6. The method of claim 1, wherein the importing the history data from the data points into the database of the supervisor makes the history data accessible by a viewer.

7. The method of claim 2, wherein managing a history view comprises adding, changing or deleting selections of the history view.

8. The method of claim 2, wherein the selecting a history point view comprises selections according to groups of sites, categories of sites, site controllers, and/or field controllers for viewing in a common history view.

9. The method of claim 8, wherein:
   the selections are cascaded so that when a group or site category is selected, just sites for the group or category selected are presented for further selection;
   the selections are cascaded so that when a site is selected, just site controllers for the sites selected are presented for further selection; or
   the selections are cascaded so that when a site controller is selected, just field controllers for the site controller selected are presented for further selection.

10. The method of claim 8, wherein:
    a user selects unique entity names for field controllers to select field controllers from the one or more site controllers; and
    based on the field controllers selected, the user is provided a list of common point groups.

11. A supervisor history viewer comprising:
    a user interface; and
    a processor connected to the user interface and configured to operate a supervisor connected to one or more site controllers in communication with one or more field controllers; and
    wherein:
    each field controller comprises:
       a control entity tag assigned to the field controller at the user interface; and
       one or more points; and
    at the supervisor, each point is assigned with a name to a normalized point group of a plurality of normalized point groups to ensure that similar points from multiple sites and field controllers are referenced by a single point group name in a normalized point group name list, wherein at least one point is assigned to a first normalized point group and at least one other point is assigned to a second normalized point group different than the first normalized point group.

12. The viewer of claim 11, wherein each point comprises a history extension.

13. The viewer of claim 12, wherein similar points from one or more field controllers can be referenced by one point group name of the normalized point group.

14. The viewer of claim 13, wherein:
    the one or more points provide historical data;
    the historical data are provided to a database of the supervisor; and
    the historical data are accessible in a form of view selections from the supervisor.

15. The viewer of claim 14, wherein:
the view selections can be added to, subtracted from, changed or deleted;
the view selections are configurable according to view type, data orientation and time range;
the view selections are stackable oriented by field controller, site controller or site; and
sites, site controllers and field controllers are viewable as view selections of a common history view.

16. The viewer of claim 14, wherein:
the view selections are cascaded so that when a group or site category is selected, just sites for the group or category selected are presented for further selection;
the view selections are cascaded so that when a site is selected, just site controllers for the sites selected are presented for further selection; or
the view selections are cascaded so that when a site controller is selected, just field controllers for the site controller selected are presented for further selection.

17. A method for providing a supervisory viewer, the method comprising:
providing a supervisor, one or more site controllers and one or more field controllers, wherein the one or more field controllers are configured to control building equipment;
assigning a control entity tag to each field controller;
navigating to one or more status points of each field controller;
attaching a supervisor history extension to each point; and
assigning, at the supervisor, each point with a name to a normalized point group of a plurality of normalized point groups to ensure that similar points from multiple sites and field controllers are referenced by a single point group name in a normalized point group name list, wherein at least one point is assigned to a first normalized point group and at least one other point is assigned to a second normalized point group different than the first normalized point group; and
wherein:
the status points provide history data which are conveyed from a respective field controller to a respective site controller;
the history data is pulled from the site controllers into a database of the supervisor; and
a history view is based on history data from the database of the supervisor.

18. The method of claim 17, further comprising selecting groups of sites, site controllers and field controllers to be viewed in a common history view.

19. The method of claim 18, further comprising:
configuring the history view to view type, data orientation and time range; or stacking data in the history view according to a presence or absence of a group, site, site controller and/or field controller.

20. The method of claim 17, wherein:
each field controller of the one or more field controllers is connected with a site controller;
a unique name is assigned to each field controller of a site controller at a user interface of the supervisor;
field controllers are selected from selected site controllers according to names of the field controllers; and
a list of common point groups are provided on a basis of the filed controllers selected.

* * * * *